(12) United States Patent
Omori et al.

(10) Patent No.: US 12,524,568 B2
(45) Date of Patent: Jan. 13, 2026

(54) USER INFORMATION MANAGEMENT SYSTEM, USER INFORMATION MANAGEMENT METHOD, USER AGENT AND PROGRAM

(71) Applicant: NTT, Inc., Tokyo (JP)

(72) Inventors: Yoshihiko Omori, Musashino (JP); Takao Yamashita, Musashino (JP); Yurika Suga, Musashino (JP); Yasuhiko Yoshimura, Musashino (JP)

(73) Assignee: NTT, Inc., Tokyo (JP)

( * ) Notice: Subject to any disclaimer, the term of this patent is extended or adjusted under 35 U.S.C. 154(b) by 292 days.

(21) Appl. No.: 18/267,672

(22) PCT Filed: Dec. 15, 2020

(86) PCT No.: PCT/JP2020/046774
§ 371 (c)(1),
(2) Date: Jun. 15, 2023

(87) PCT Pub. No.: WO2022/130507
PCT Pub. Date: Jun. 23, 2022

(65) Prior Publication Data
US 2024/0104241 A1    Mar. 28, 2024

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01)

(58) Field of Classification Search
CPC .. G06F 21/6245; G06F 21/62; G06F 21/6254; G06F 21/602; G06F 21/60; H04L 63/0428; H04L 67/306

USPC ................ 726/27, 26, 28; 713/193
See application file for complete search history.

(56) References Cited

U.S. PATENT DOCUMENTS

| | | | |
|---|---|---|---|
| 10,461,942 B1 * | 10/2019 | Vo ................... | H04L 9/3263 |
| 2001/0010044 A1 * | 7/2001 | Aieta ................. | H04L 63/126 |
| | | | 705/50 |
| 2001/0042050 A1 * | 11/2001 | Fletcher ............. | G06Q 30/06 |
| | | | 705/64 |

(Continued)

OTHER PUBLICATIONS

NPL Search Terms (Year: 2025).*
Camenisch et al., "An Efficient System for Non-transferable Anonymous Credentials with Optional Anonymity Revocation," Presented at Advances in Cryptology—Eurocrypt 2001, International Conference on the Theory and Application of Cryptographic Techniques, Innsbruck, Austria, May 6-10, 2001, Lecture Notes in Computer Science, 2045:93-117, 25 pages.

(Continued)

*Primary Examiner* — Syed A Zaidi
(74) *Attorney, Agent, or Firm* — Fish & Richardson P.C.

(57) ABSTRACT

A user agent stores user information of a user and user information provided to a service provider server. When a user terminal registers the user in the service provider server, the user agent sends the user information already provided to the service provider server to the user terminal. When the user agent receives a provision permission of the user information from the user terminal, the user agent generates pseudo user identification information, a public key, and a private key, signs a service document of the service provider server, and sends the service document to the service provider server via the user terminal. When the signed service document is received, the user agent verifies the signature and sends user information to the service provider server.

6 Claims, 19 Drawing Sheets

(56) References Cited

U.S. PATENT DOCUMENTS

| | | | | |
|---|---|---|---|---|
| 2005/0192008 | A1* | 9/2005 | Desai | H04L 67/1095 |
| | | | | 455/435.2 |
| 2010/0063929 | A1* | 3/2010 | Torigai | G06Q 20/3821 |
| | | | | 235/375 |
| 2016/0203268 | A1* | 7/2016 | Lacey | G06Q 40/08 |
| | | | | 705/3 |
| 2017/0155512 | A1* | 6/2017 | Ogura | H04L 9/3273 |
| 2017/0302445 | A1* | 10/2017 | Kobayashi | H04L 9/0869 |
| 2018/0113734 | A1* | 4/2018 | Yamato | H04L 67/1004 |
| 2019/0007525 | A1* | 1/2019 | Smith | H04L 63/166 |
| 2019/0258820 | A1* | 8/2019 | Gaspar | H04L 9/3239 |
| 2019/0333058 | A1* | 10/2019 | Hong | H04L 9/0637 |
| 2021/0067334 | A1* | 3/2021 | Angel | G06F 21/602 |
| 2023/0086806 | A1* | 3/2023 | Kamal | G06Q 20/38215 |
| | | | | 726/7 |
| 2024/0129130 | A1* | 4/2024 | Semenovskiy | G06Q 20/3825 |
| 2024/0370585 | A1* | 11/2024 | Madhavapeddi | H04L 67/306 |

OTHER PUBLICATIONS

Omori et al., "A Study on Sharing Method of User Credentials for Self-Sovereign Identity," The Institute of Electronics, Information and Communication Engineers 2020 General Conference, Mar. 2020, 3 pages (with machine translation).

Reed et al., "Decentralized Identifiers (DIDs) v1.0 Core architecture, data model, and representations," W3C Working Draft, Oct. 2020, 92 pages.

* cited by examiner

Fig. 5

| TYPE 141 | USER INFORMATION 142 | PROVIDING DESTINATION 143 |
|---|---|---|
| e-mail | aaa@bb.ne.jp | (SERVER A, ehd738), ··· |
| e-mail | ccc@dd.com | (SERVER B, 9e4fe3b), ··· |
| ONLINE NAME | ekf3id5e | (SERVER A, ehd738), ··· |
| ONLINE NAME | 7vdee5qr3 | (SERVER C, 1ik3r5), ··· |
| YEAR OF BIRTH | 1983 | (SERVER A, ehd738), ··· |
| ··· | ··· | ··· |

| INFORMATION TYPE | USER INFORMATION | PRIMARY BUSINESS OPERATOR (SERVICE PROVIDER A) | SECONDARY BUSINESS OPERATOR (CONTRACTOR B) |
|---|---|---|---|
| USER INFORMATION TO BE PROVIDED TO SERVICE PROVIDER | | | |
| NAME | PATENT TARO | ○ | ○ |
| ADDRESS | MINAMI-KU, TOKYO | ○ | —(PROVIDED) |
| DATE OF BIRTH | 1987/1/1 | ○ | ○(PROVIDED) |

\* RISK LEVEL OF NAME IDENTIFICATION
CONTRACTOR B HAS POSSIBILITY OF ASCERTAINING BY NAME IDENTIFICATION THAT YOU ARE RESIDENT IN MINAMI-KU, TOKYO OR THAT OTHER USERS OF SAME DATE OF BIRTH ARE RESIDENT IN MINAMI-KU, TOKYO.

PROVIDING  NOT PROVIDING 631  632

Fig. 18

| INFORMATION TYPE | USER INFORMATION | PROVIDING AVAILABILITY | PRIMARY BUSINESS OPERATOR (SERVICE PROVIDER A) | SECONDARY BUSINESS OPERATOR (CONTRACTOR B) |
|---|---|---|---|---|
| NAME | PATENT TARO | ✔ | ○ | ○ |
| E-MAIL | aaa@bb.ne.jp | | ○ | ○ (PROVIDED) |
| E-MAIL | ccc@dd.com | ✔ | ○ | ○ |

USER INFORMATION TO BE PROVIDED TO SERVICE PROVIDER — 600A

610A

* RISK LEVEL OF NAME IDENTIFICATION
CONTRACTOR B IS ALREADY PROVIDED WITH E-MAIL ADDRESS "aaa@bb.ne.jp".
BY PROVIDING ANOTHER E-MAIL ADDRESS "ccc@dd.com," RISK OF NAME IDENTIFICATION CAN BE REDUCED.

620A

PROVIDING  631
NOT PROVIDING  632

USER INFORMATION MANAGEMENT SYSTEM, USER INFORMATION MANAGEMENT METHOD, USER AGENT AND PROGRAM

CROSS-REFERENCE TO RELATED APPLICATIONS

This application is a National Stage application under 35 U.S.C. § 371 of International Application No. PCT/JP2020/046774, having an International Filing Date of Dec. 15, 2020, the disclosure of which is considered part of the disclosure of this application, and is incorporated by reference in its entirety into this application.

TECHNICAL FIELD

The present invention relates to a user information management system, a user information management method, a user agent, and a program for managing distribution of user information.

BACKGROUND ART

Service providers such as major social networking service (SNS) sites, search sites, and mail-order sites of the major SNSs not only have a monopoly position in their respective industries but also the advantage of holding the personal information of their users. Although there is an advantage that high-level services are provided by using personal information, there have been cases of leaking of personal information or personal information being provided to third parties without the knowledge of users, which is a social problem.

In response to the above problem, a concept of self-sovereign identity ID (SSI) management is spreading with the aim of enabling users to manage (control) their own personal information rather than having service providers manage their own personal information (NPL 1). According to SSI, user information (user credentials) such as the user's address and qualifications are stored in a service endpoint. In response to a request from the service provider, the service endpoint sends user information. By controlling the access right to the user information at the service end point, the user can control the providing destination (the distribution destination and the transfer destination) of the user information.

In SSI, provision of user information to a secondary business operator such as a contractor or collaboration partner of the service provider is not considered. According to a method described in NPL 2, a user terminal signs service documents of the service provider and the secondary provider, thereby approving the access right to the user information and managing the distribution destination of the user information.

Further, the user information to be distributed is limited to a range necessary for providing the service.

CITATION LIST

Non Patent Literature

[NPL 1] Decentralized Identifiers (DIDs) v1.0, W3C Working Draft, The World Wide Web Consortium, 24 Nov. 2020, [online], [retrieved on Dec. 1, 2020], the Internet <https://w3c.github.io/did-core/>
[NPL 2] Yoshihiko OMORI et al., "Study on how to manage the distribution of user information in self-sovereign identity," The Institute of Electronics, Information and Communication Engineers 2020 General Conference, D-19-6, 2020.

SUMMARY OF INVENTION

Technical Problem

In a case where different service providers use the same contractor (secondary business operator), the contractor can perform name identification (integration) based on the identification information and user information of the same user. Then, the contractor can ascertain user information such as attribute information and an action history of users held by a plurality of service providers. In addition, even if the user uses the service by using different user identification information, the contractor has the user information possessed by the different service providers as one piece of user information. Then, one business operator (contractor) has more user information than intended by the user, which is undesirable from the standpoint of privacy protection.

The present invention has been made in view of such a background, and an object of the present invention is to enable distribution control of user information that suppresses name identification.

Solution to Problem

In order to solve the above problem, a user information management system according to the present invention is a user information management system including a user terminal used by a user, a user agent, and a service provider server, in which the user agent includes a storage unit that stores a registered user database in which user identification information of the user and user information of the user are stored in association with each other, and a provided user information database in which the service provider server and user information provided to the service provider server are stored in association with each other, a user information providing destination search unit that receives a request from the user terminal with a service provider service document including identification information of the service provider server and a user information type that is a type of user information requested by the service provider server, and transmits user information of a user of the user terminal already provided to the service provider server and user information of the user corresponding to the user information type to the user terminal, and a user information access right approval unit that receives service provider server provision permission user information indicating user information to be provided to the service provider server from the user terminal, generates pseudo user identification information that is user identification information of the user in the service provider server and a pair of a private key and a public key associated with the pseudo user identification information, generates a signed service provider service document obtained by adding a signature to the service provider service document using the private key, and transmits the pseudo user identification information and the signed service provider service document to the user terminal, the user terminal includes a user information provision request unit that transmits the service provider server provision permission user information to the user agent, and a service document transfer unit that transmits the pseudo user identification information and the signed service provider service document to the service provider server, the service provider server includes a user information request unit that transmits the pseudo user identification information and the signed service provider service document to the user agent, and the user agent further includes a user information providing unit that verifies a signature of the signed service provider service document using a public key associated with the pseudo user identification information, and returns the service provider server provision permission user information to the service provider server in a case where the verification is successful.

Advantageous Effects of Invention

According to the present invention, it is possible to control the distribution of user information that suppresses name identification.

BRIEF DESCRIPTION OF DRAWINGS

FIG. 5 is a data configuration diagram of a provided user information database according to the present embodiment.

FIG. 15 is a configuration diagram of a provision user information confirmation screen according to the present embodiment.

FIG. 18 is a configuration diagram of a provision user information confirmation screen according to a modification example of the present embodiment.

DESCRIPTION OF EMBODIMENTS

<<Overview of User Information Management System>>

Figure 1:
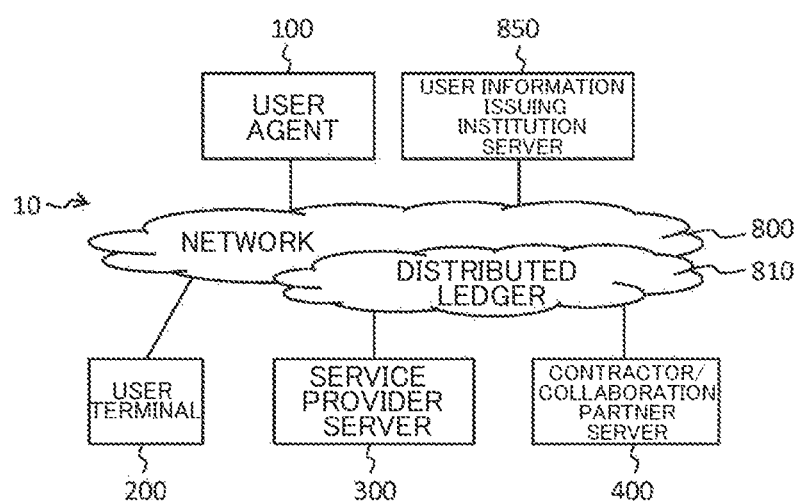
FIG. 1 is a diagram illustrating an overall configuration of a user information management system according to the present embodiment.

Hereinafter, a user information management system in a mode (embodiment) for carrying out the present invention will be described. FIG. 1 is a diagram illustrating an overall configuration of a user information management system 10 according to the present embodiment. The user information management system 10 includes a user agent 100, a user terminal 200, and a service provider server 300. The user information management system 10 may further include a contractor/collaboration partner server 400 or a distributed ledger 810, and a user information issuing institution server 850 operated by a contractor/collaboration partner of a service provided to the user by the service provider. The user agent 100, the user terminal 200, the service provider server 300, the contractor/collaboration partner server 400, the distributed ledger 810, and the user information issuing institution server 850 can communicate via a network 800.

The user information issuing institution server 850 issues user information. A signature of the user information issuing institution server 850 is given to the user information. The user information is information on a qualification acquired by a user, an organization to which the user belongs, and the like. The user information may be information such as a current address and a date of birth declared by the user himself or herself.

The distributed ledger 810 includes a plurality of servers.

The distributed ledger 810 stores a service document issued by the service provider server 300 and the contractor/collaboration partner server 400, and the acquisition history of the user information issued by the user agent 100. In addition, the distributed ledger 810 also provides service documents and acquisition histories in response to requests from the user agent 100, the user terminal 200, the service provider server 300, and the contractor/collaboration partner server 400.

Before describing the configuration of the user agent 100, the user terminal 200, the service provider server 300, and the contractor/collaboration partner server 400, the user information and the overview of processing in the user information management system 10 for handling the user information will be described.

<<Overview of User Information Management System: User Information>>

In providing the service, the service provider server 300 or the contractor/collaboration partner server 400 acquires user information when a user applies to register for the service or when the service is provided, and uses the user information for providing the service or check whether or not the user is qualified to be provided with the service. For example, in the housing loan service, a withholding certificate slip issued by the working place of the user is acquired and used for examination of the loan, and it is confirmed that the user is an adult in an alcoholic beverage selling site.

The service provider server 300 or the contractor/collaboration partner server 400 lists user information necessary for providing the service of itself in the service document. The user information listed in the service document is a type of user information such as a date of birth and an academic background, and is also referred to as a user information type. The user refers to the service document of the service provider server 300, confirms user information required by the service provider, and determines whether to use the service. In a case where the service provider server 300 provides services not independently but in cooperation (collaboration) with the contractor/collaboration partner server 400, the user checks the contractor/collaboration partner server 400 listed in the service document of the service provider server 300 and the user information listed in the service document of the contractor/collaboration partner server 400, and determines whether to use the service.

<<Overview of User Information Management System: Flow of User Information Management>>

Figure 2:
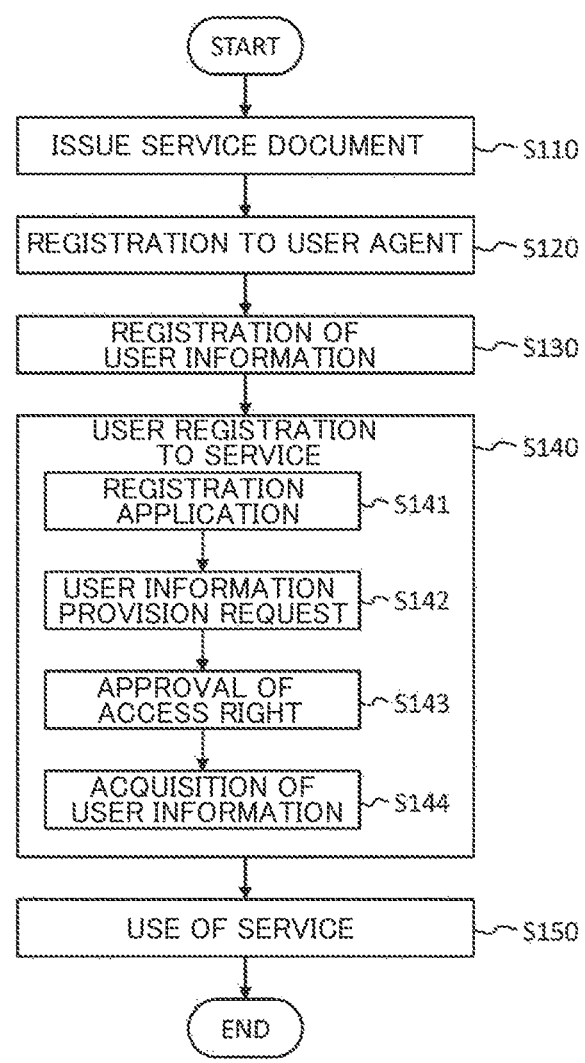
FIG. 2 is a flowchart illustrating an overview of processing in the information management system according to the present embodiment.

FIG. 2 is a flowchart illustrating an overview of processing in the user information management system 10 according to the present embodiment. Referring to FIG. 2, the user registration processing for the service provided by the service provider server 300 and the processing to be prepared before the user registration processing will be described.

In step S110, the service provider server 300 and the contractor/collaboration partner server 400 issue their own service documents and register them in the distributed ledger 810 (see FIG. 9 described later). The service document of the service provider server 300 includes identification information of the service provider server 300, a public key, and user information (user information type) required for service provision of the service provider server 300. In addition, the service document includes identification information of the contractor/collaboration partner server 400 which is a contractor/collaboration partner of the service. Further, the service document may include a location of the service provider server 300.

The service document of the contractor/collaboration partner server 400 is similar to the service document of the service provider server 300, and includes identification information and a public key of the contractor/collaboration partner server 400, and a user information type necessary for service provision. The service document may be provided with a signature of the service provider confirmation institution server (not shown) which has confirmed the authenticity of the service document.

In step S120, the user agent 100 receives a user registration request from the user terminal 200 and registers the user (see FIG. 10 described later).

In step S130, the user terminal 200 requests the user information issuing institution server 850 to issue user information to acquire the user information, and registers the acquired user information in the user agent 100 (see FIG. 11 described later).

In step S140, the user terminal 200 registers a user with the service provider server 300 (user registration to the service). The registration includes step S141 to step S144.

In step S141, the user terminal 200 requests the service provider server 300 to register the user for the service (see FIG. 12 described later). At this time, the user terminal 200 acquires the service document of the service provider server 300. When the service provider has the contractor/collaboration partner, the user terminal 200 also acquires the service document of the contractor/collaboration partner server 400.

In step S142, the user terminal 200 requests the user agent 100 to provide user information to the service provider server 300 and the contractor/collaboration partner server 400 (see FIGS. 12 and 13 described later). The user determines whether to provide user information required by the service provider server 300 and the contractor/collaboration partner server 400 included in the service document. Further, the user refers to user information already provided to the service provider server 300 and the contractor/collaboration partner server 400 provided by the user agent 100, and determines whether to provide the user information. The user terminal 200 receives input of information permitted to be provided by the user, and requests the user agent 100 to provide the user information.

The request of the provision of the user information means that the user (user terminal 200) approves the access right to the user information to the service provider server 300 and the contractor/collaboration partner server 400.

In step S143, the user agent 100 signs the service document using the user's (pseudo user described later) private key. The signed service document is transmitted to the service provider server 300 and the contractor/collaboration partner server 400 via the user terminal 200 (see FIGS. 13 and 14). The service document with the signature of the user becomes a certificate that the access right to the user information is approved for the service provider server 300 and the contractor/collaboration partner server 400.

Figure 16:
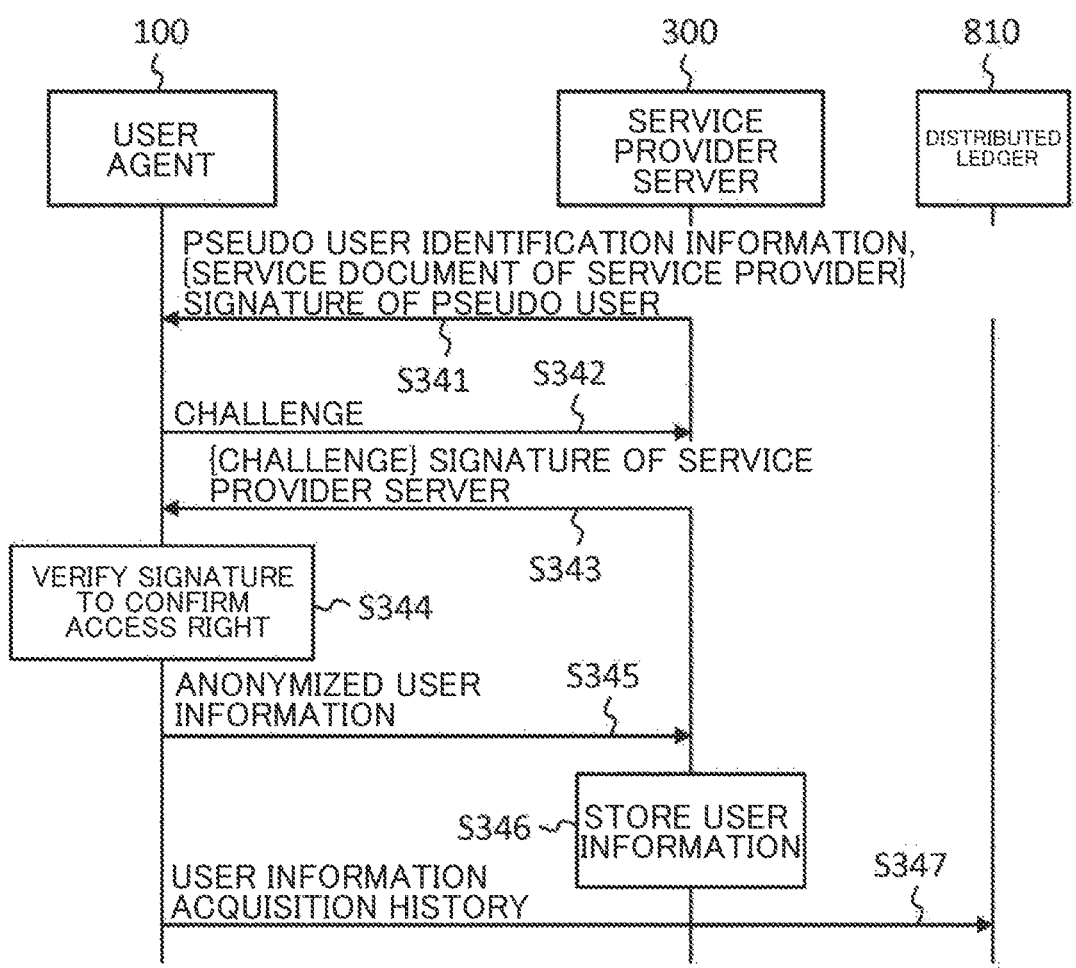
FIG. 16 is a sequence diagram of user information acquisition processing of the service provider server according to the present embodiment.

In step S144, the service provider server 300 requests user information from the user agent 100 along with the user's signed service document (see FIG. 16). The user agent 100 verifies the signature of the user given to the service document to confirm that the service provider server 300 has an access right to the user information of the user information type described in the service document, and transmits the user information to the service provider server 300. The same applies to the contractor/collaboration partner server 400 (see FIG. 17).

The user information transmitted by the user agent 100 is not limited to the user information itself registered in the step S130, but is the minimum range of information (coarse-grained information, highly abstract information) corresponding to the user information type described in the service document. For example, if the user information listed in the service document is an adult or not, the user agent 100 determines whether the user is an adult or not from the date of birth and transmits only the determination result. If the user information listed in the service document is the residence prefecture, the user agent 100 transmits only the prefecture, excluding the house number of the registered address (see step S130).

The user identification information registered in the service provider server 300 and the contractor/collaboration partner server 400 is pseudo user identification information that differs for each registration. The pseudo user identification information is adopted in order to prevent the provided user information and the use history of the provided service from being ascertained as the same user because the user identification information is registered in a different service provider server 300 when the user identification information is registered in the same user identification information. In order to avoid the name identification, a user is registered as a pseudo user of pseudo user identification information in the service provider server 300 and the contractor/collaboration partner server 400.

Thus, the user is registered in the service provided by the service provider server 300, and the user can use the service.

In step S150, the user uses the service provided by the service provider server 300 using the user terminal 200.

<<Configuration of User Agent>>

Figure 3:
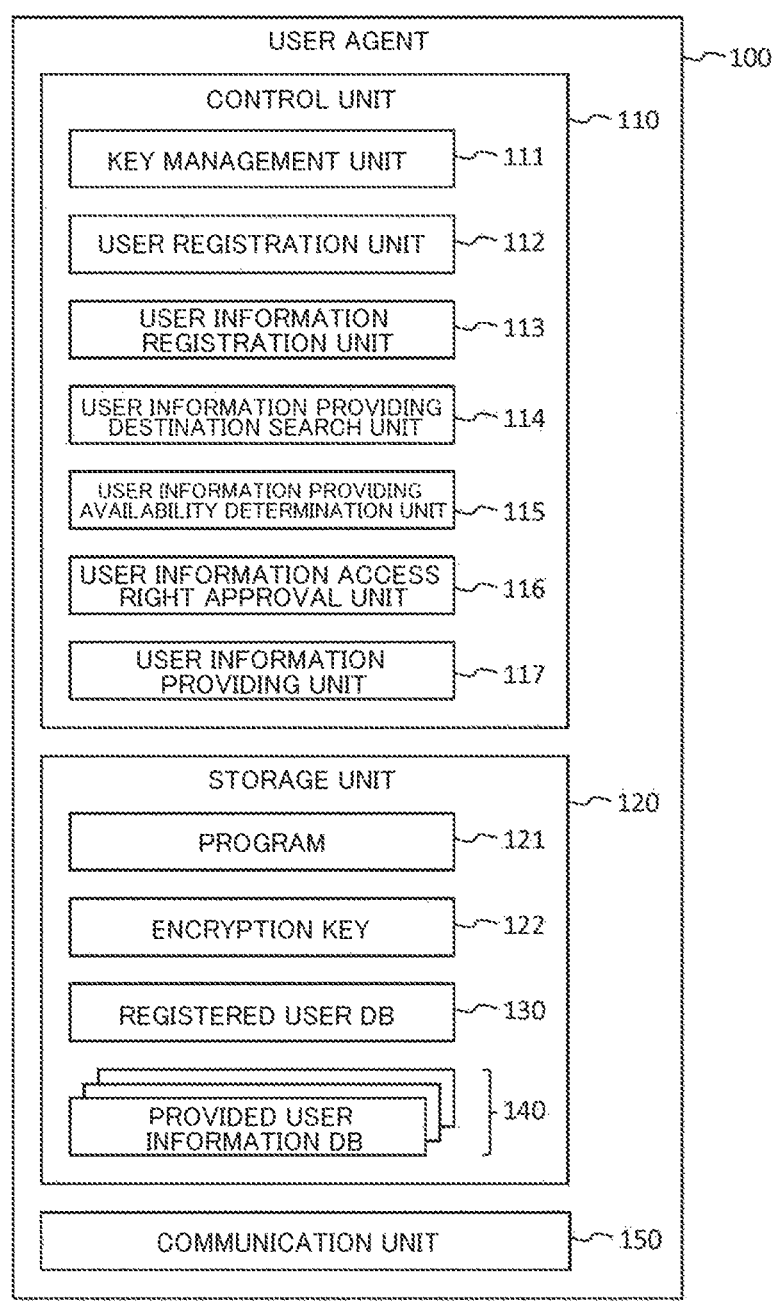
FIG. 3 is a functional block diagram of a user agent according to the present embodiment.

FIG. 3 is a functional block diagram illustrating the user agent 100 according to the present embodiment. The user agent 100 includes a control unit 110, a storage unit 120, and a communication unit 150. The communication unit 150 transmits and receives communication data to and from the user terminal 200, the service provider server 300, the contractor/collaboration partner server 400, or the like.

The storage unit 120 includes storage devices such as Read Only Memory (ROM), Random Access Memory (RAM), Solid State Drive (SSD), and the like. The storage unit 120 stores a program 121, an encryption key 122, a registered user database 130 (described as a registered user database (DB) in FIG. 3), and a provided user information database 140 (described as a provided user information DB in FIG. 3). The provided user information database 140 is one or more data pieces stored for each user registered in the user agent 100.

The program 121 includes described as processing procedures of the user agent 100 in user registration processing (step S120 in FIG. 2, see FIG. 10 described later), access right approval processing (step S143, see FIG. 13 described later), and user information acquisition processing (step S144, see FIGS. 16 and 17 described later) executed by the control unit 110. The encryption key 122 is an encryption key for encryption and authentication of communication data in communication with the user terminal 200, the service provider server 300, and the contractor/collaboration partner server 400.

<<Configuration of User Agent: Registered User Database>>

Figure 4:
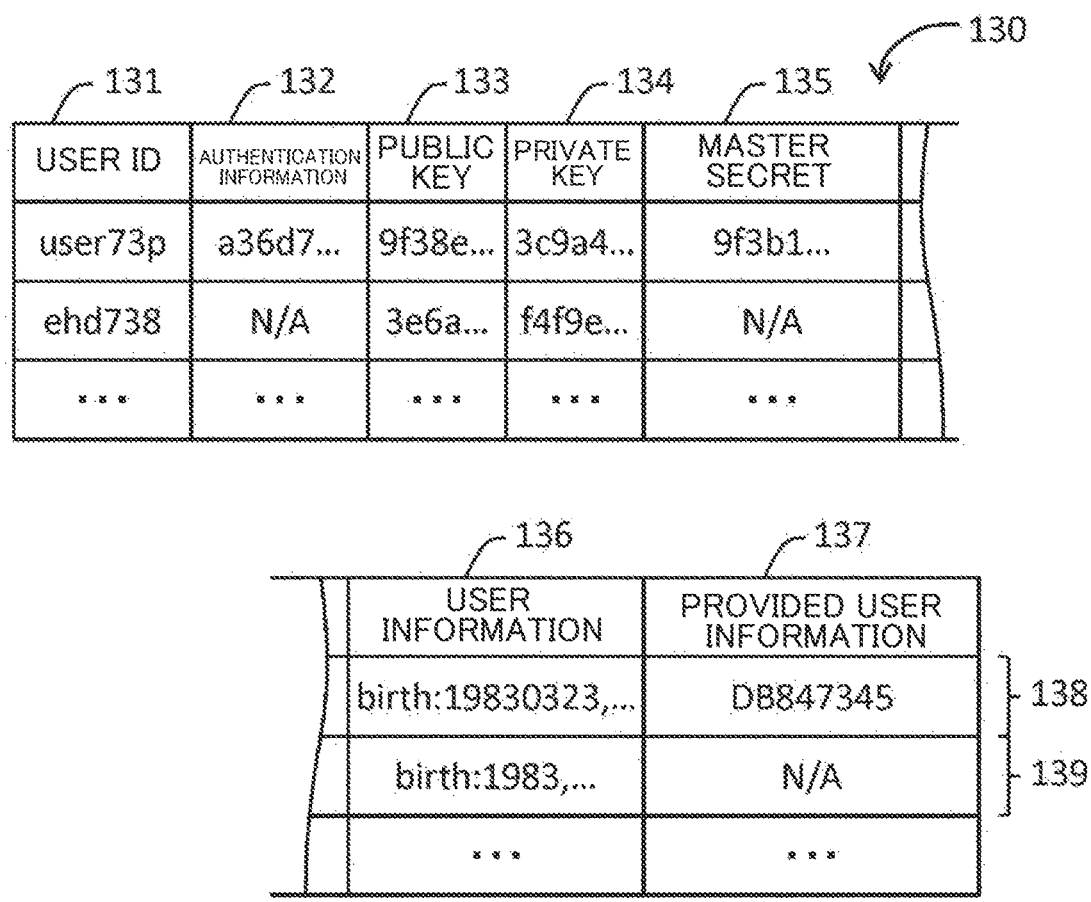
FIG. 4 is a data configuration diagram of a registered user database according to the present embodiment.

FIG. 4 is a data configuration diagram of the registered user database 130 according to the present embodiment. The registered user database 130 is, for example, tabular data stored in a secure area of the user agent 100, and includes information related to a user of the user terminal 200. One row (record) of the registered user database 130 indicates one user or pseudo user, and includes columns (attributes) of user identification information 131 (described as a user ID in FIG. 4), authentication information 132, a public key 133, a private key 134, a master secret 135, user information 136, and provided user information 137.

The user identification information 131 is identification information of a user or a pseudo user.

The authentication information 132 is information used for authentication of the user and the user terminal 200 in communication with the user terminal 200. The authentication information 132 is, for example, the public key of the user terminal 200 or a password used for user authentication.

The public key 133 and the private key 134 are pairs of public key encryption keys.

The master secret 135 is information used for anonymous processing to be described later.

The user information 136 is one or more pieces of user information acquired and registered by a user from the user information issuing institution server 850. At the beginning of registration of the user, the user information 136 does not include the user information. The user information 136 is stored in a confidential form using a master secret 135 (shown in readable form in FIG. 4). In a case where the user identification information 131 is identification information of the pseudo user, the user information 136 indicates user information provided to the service provider server 300 and the contractor/collaboration partner server 400.

The provided user information 137 is identification information of the provided user information database 140 of the user identified by the user identification information 131. In one or more provided user information databases 140, the provided user information 137 indicates the provided user information database 140 of the user.

In a record 138, the user identification information 131 is "user 73p," and the user information 136 stores user information of the date of birth.

Information of the pseudo user is registered in a record 139, and the authentication information 132, the master secret 135, and the provided user information 137 are empty ("N/A").

<<Configuration of User Agent: Provided User Information Database>>

FIG. 5 is a data configuration diagram of the provided user information database 140 according to the present embodiment.

The provided user information database 140 is, for example, tabular data, and stores information related to user information provided to the service provider server 300 and the contractor/collaboration partner server 400. One row (record) of the provided user information database 140 includes columns (attributes) of type 141, user information 142, and a providing destination 143.

The type 141 is a type of the provided user information 142.

The type includes an e-mail address, an online name of SNS, an address, or the like.

The user information 142 is provided user information.

The providing destination 143 includes identification information of the service provider server 300 or the contractor/collaboration partner server 400 which is a providing destination of the user information 142, and pseudo user identification information when provided (user registration). In place of the identification information of the service provider server 300 and the contractor/collaboration partner server 400, the identification information (for example, "service provider A," or the like) of the business operator that operates the service provider server 300 or the contractor/collaboration partner server 400 may be included.

A record 149 indicates that a user has been registered with pseudo user identification information "ehd738" in "Server A" and has provided user information with an e-mail address "aaa@bb.ne.jp".

The provided user information database 140 illustrated in FIG. 5 is the registered user database 130 in which the provided user information 137 of the user whose user identification information 131 shown in the record 138 (see FIG. 4) is "user73p" is "DB847345". From the record 149, it can be seen that "ehd738" exists in the pseudo user identification information of the user. Further, it can be seen that the record 139 indicates the user's pseudo user indicated in the record 138. The user information 136 of the user includes the date of birth, but it can be seen that only "1983" which is the year of birth is provided as the pseudo user.

<<Configuration of User Agent: Control Unit>>

Returning to FIG. 3, the control unit 110 includes a central processing unit (CPU), a key management unit 111, a user registration unit 112, a user information registration unit 113, a user information providing destination search unit 114, a user information providing availability determination unit 115, a user information access right approval unit 116, and a user information providing unit 117.

The key management unit 111 generates the public key 133 (see FIG. 4) and the private key 134 of a user or a pseudo user.

The key management unit 111 generates the master secret 135, an encryption key used for communication, a challenge (random number) used for authentication of a communication partner, and the like. Further, the key management unit 111 performs processing such as encryption, decryption, and signature using the encryption key 122.

The user registration unit 112 executes user registration processing (see FIG. 10 described later) with the user agent 100. More specifically, the user registration unit 112 generates the user identification information 131 (see FIG. 4), the authentication information 132, the public key 133, the private key 134, and the master secret 135, the stores them in the registered user database 130, and registers the user.

The user information registration unit 113 executes user information registration processing (see FIG. 11 described later). More specifically, the user information transmitted from the user terminal 200 is registered in the registered user database 130.

The user information providing destination search unit 114 searches user information already provided to the service provider server 300 and the contractor/collaboration partner server 400, and transmits the searched information to the user terminal 200.

The user information providing availability determination unit 115 determines a risk level of name identification by providing user information accompanying user registration to the service provider server 300. For example, it is assumed that the e-mail address "ccc@dd.com" has been provided to the contractor/collaboration partner server 400. This time, if the contractor/collaboration partner server 400 is included as the contractor of the service provider server 300 to be registered by the user, it is determined that the provision of the same "ccc@dd.com" has a high risk of name identification, and a message for the user is generated to the effect.

The user information providing availability determination unit 115 determines that the lower the abstraction degree is, the higher the risk of name identification for user information which is not the identification information. For example, with respect to the address, "Minami-ku, Tokyo" has a lower degree of abstraction than "Tokyo," and the user information providing availability determination unit 115 determines that the risk of name identification is high when provided. Also, the user information providing availability determination unit 115 determines that the level becomes higher as the number of pieces of user information to be provided increases even user information with a low risk level.

When the provision of the user information is permitted (approved) to provide user information, the user information access right approval unit 116 signs the service document of the service provider server 300 or the contractor/collaboration partner server 400 using the private key 134 of the pseudo user (see FIG. 4). The service document with the signature of the pseudo user becomes a certificate indicating that the access right to the user information is approved for the service provider server 300 and the contractor/collaboration partner server 400.

The user information providing unit 117 provides user information according to a request from the service provider server 300 or the contractor/collaboration partner server 400 (see FIG. 16 and FIG. 17 described later). More specifically, when the verification of the signature of the pseudo user given to the service document is successful, the user information providing unit 117 confirms the requested user information to the service provider server 300 and the contractor/collaboration partner server 400 having the access right. Next, the user information providing unit 117 acquires user information corresponding to the requested user information from the user information items 136 and 142 (see FIGS. 4 and 5), converts the user information items into the requested user information items, and transmits the user information items.

For example, if the user information listed in the service document is a resident prefecture, the user information providing unit 117 transmits only the prefecture of the address. Such techniques are also called anonymous processing, and are described, for example, in the following document: Jan Camenisch and Anna Lysyanskaya, "An Efficient System for Non-transferable Anonymous Credentials with Optional Anonymity Revocation," Advances in Cryptology Eurocrypt 2001, pp. 93-117. Note that the user information providing unit 117 uses the master secret 135 (see FIG. 4) during the anonymous processing.

<<Configuration of User Terminal>>

Figure 6:
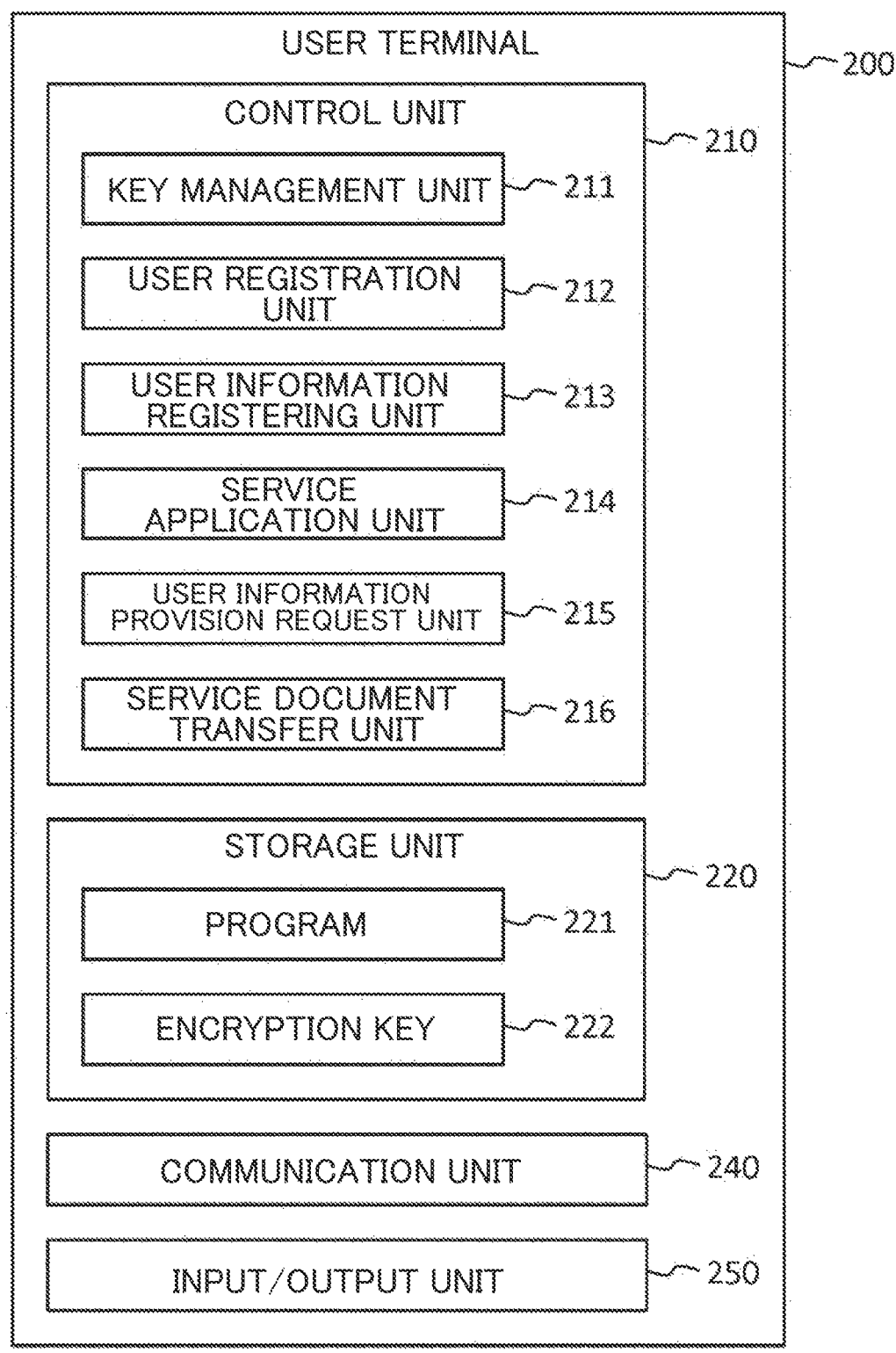
FIG. 6 is a functional block diagram of a user terminal according to the present embodiment.

FIG. 6 is a functional block diagram of the user terminal 200 according to the present embodiment. The user terminal 200 includes a control unit 210, a storage unit 220, a communication unit 240, and an input/output unit 250. The communication unit 240 transmits and receives communication data to and from the user agent 100, the service provider server 300, the user information issuing institution server 850, and the like. The input/output unit 250 exchanges data with user interface devices such as a display, a keyboard, and a mouse.

The storage unit 220 is configured of storage devices such as RAM and SSD. A program 221 and an encryption key 222 are stored in the storage unit 220. The program 221 includes described as processing procedures of the user terminal 200 in user registration processing (step S120 in FIG. 2, see FIG. 10 described later), user information registration processing (step S130, see FIG. 11 described later), and user registration processing for service (step S140, see FIGS. 12, 13, and 14 described later) to the user agent 100 executed by the control unit 210. The encryption key 222 is an encryption key for encryption and authentication of communication data in communication with the user agent 100, the service provider server 300, the user information issuing institution server 850, and the like.

The control unit 210 includes a CPU, a key management unit 211, a user registration unit 212, a user information registration unit 213, a service application unit 214, a user information provision request unit 215, and a service document transfer unit 216.

The key management unit 211 generates the encryption key 222 and a challenge (random number) used for authentication of a communication partner, and performs processing such as encryption, decryption, signature, and the like using the encryption key 222.

The user registration unit 212 executes user registration processing with the user agent 100 (step S120 in FIG. 2, see FIG. 10 described later).

The user information registration unit 213 acquires user information from the user information issuing institution server 850 and registers the user information in the user agent 100 (step S130 in FIG. 2, see FIG. 11 described later). The service application unit 214 applies to the service provider server 300 for the user to register for the service (step S141 in FIG. 2, see FIG. 12 described later).

The user information provision request unit 215 requests the user agent 100 to provide user information (access right approval) to the service provider server 300 and the contractor/collaboration partner server 400 (step S142 in FIG. 2, see FIGS. 12 and 13 described later). More specifically, the user information provision request unit 215 inquires the user the availability of providing the user information, and acquires the availability. The user information provision request unit 215 requests the user agent 100 to provide the user information (approve the access right of the user information).

The service document transfer unit 216 acquires a signed service document indicating user information access rights from the user agent 100 and transmits the service document to the service provider server 300 (see FIG. 14 described later).

<<Configuration of Service Provider Server>>

Figure 7:
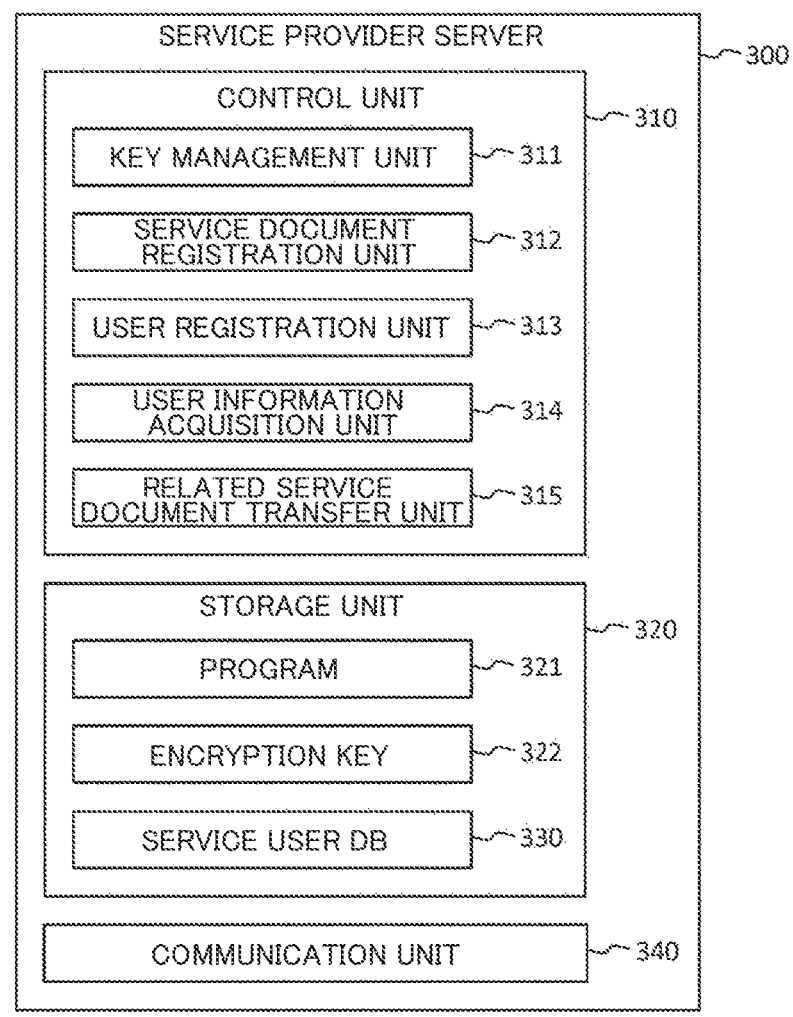
FIG. 7 is a functional block diagram of a service provider server according to the present embodiment.

FIG. 7 is a functional block diagram of the service provider server 300 according to the present embodiment. The contractor/collaboration partner server 400 has the same functional configuration as the service provider server 300. The service provider server 300 includes a control unit 310, a storage unit 320, and a communication unit 340. The communication unit 340 transmits and receives communication data to and from the user agent 100, the user terminal 200, the contractor/collaboration partner server 400, or the like.

The storage unit 320 is composed of storage devices such as RAM and SSD. In the storage unit 320 stores a program 321, an encryption key 322, and a service user database 330 (described as a "service user DB" in FIG. 7, see FIG. 8 described later). The program 321 includes described as processing procedures of the service provider server 300 in service document issuing processing (step S110 in FIG. 2, see FIG. 9 described later) or acquisition processing of user information from the user agent 100 (step S144, see FIG. 16 described later) executed by the control unit 310. The encryption key 322 is an encryption key for encryption and authentication of communication data in communication with the user agent 100, the user terminal 200, or the contractor/collaboration partner server 400. The encryption key 322 includes a public key and a private key of the service provider server 300.

Figure 8:
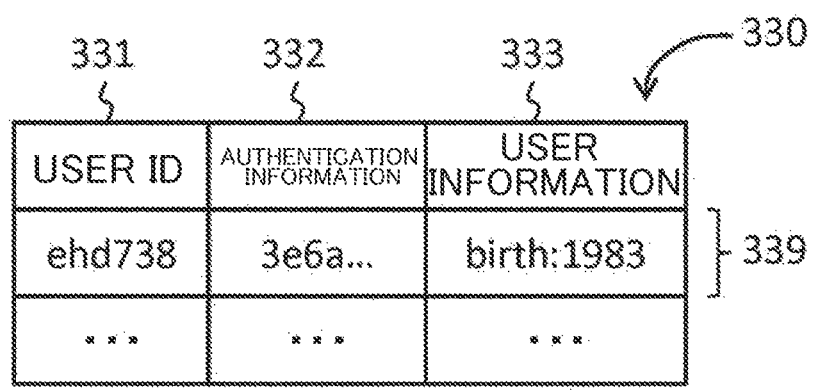
FIG. 8 is a data configuration diagram of a service user database according to the present embodiment.

FIG. 8 is a data configuration diagram of the service user database 330 according to the present embodiment. The service user database 330 is, for example, tabular data, and includes information related to a user of the user terminal 200 using the service of the service provider server 300. One row (record) of the service user database 330 indicates one user, and includes user identification information 331 (described as a user ID in FIG. 8), authentication information 332, and user information 333.

The user identification information 331 and the authentication information 332 are identification information and authentication information when the user uses the service. The user registered in the service provider server 300 is a pseudo user, and the pseudo user identification information is stored in the user identification information 331.

The user information 333 is user information acquired from the user agent 100.

The user identification information 131 of a record 339 is "ehd 738," and user information of a year of birth is registered in the user information 333. The user of the record 339 is the same pseudo user as the record 139 (see FIG. 4).

Returning to FIG. 7, the control unit 310 includes a CPU, a key management unit 311, a service document registration unit 312, a user registration unit 313, a user information acquisition unit 314, and a related service document transfer unit 315.

The key management unit 311 generates the encryption key 322 and a challenge (random number) used for authentication of a communication partner, and performs processing such as encryption, decryption, signature, and the like using the encryption key 322.

The service document registration unit 312 issues a service document and registers it in the distributed ledger 810 (step S110 in FIG. 2, see FIG. 9 described later).

The user registration unit 313 performs processing corresponding to a registration application to the service of the user (step S141, see FIG. 12 described later). The user information acquisition unit 314 (the user information providing request unit, the related user information request unit) presents the signed service document to the user agent 100, acquires user information, and registers it in the user's record in the service user database 330 (step S144, see FIG. 16 described later).

The related service document transfer unit 315 transfers the pseudo user identification information acquired from the user terminal 200, the signed service document of the service provider server 300, and the signed service document of the contractor/collaboration partner server 400 to the contractor/collaboration partner server 400 (see FIG. 14 described later).

<<Issuing Processing of Service Document>>

Figure 9:
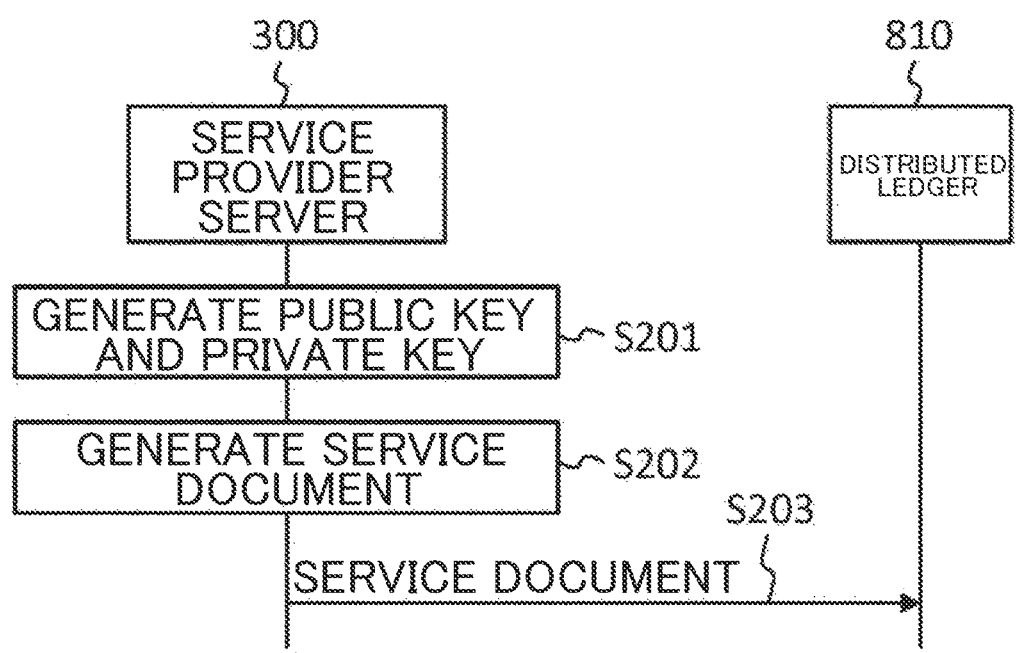
FIG. 9 is a sequence diagram of service document issuing processing of the service provider server according to the present embodiment.

FIG. 9 is a sequence diagram of service document issuing processing of the service provider server 300 according to the present embodiment. The processing contents of step S110 (see FIG. 2) will be described with reference to FIG. 9.

In step S201, the key management unit 311 of the service provider server 300 generates a pair of a public key and a private key, and stores the pair in the encryption key 322.

In step S202, the service document registration unit 312 of the service provider server 300 generates a service document. Specifically, the service document registration unit 312 generates identification information of the service provider server 300. Next, the service document registration unit 312 generates a service document including the identification information, the public key generated in the step S201, and the user information type. The user information type is a type of user information necessary for the service provider server 300 to provide a service to a user, and is a type of user information acquired at the time of user registration or service use. The service document includes identification information of the contractor/collaboration partner server 400 as a distribution destination of the user information. In addition, the service document may include a location of the service provider server 300.

In step S203, the service document registration unit 312 registers the service document generated in the step S202 in the distributed ledger 810.

In the same manner as in FIG. 9, the contractor/collaboration partner server 400 also generates the service document and registers the service document in the distributed ledger 810.

<<User Registration Processing of User Agent>>

Figure 10:
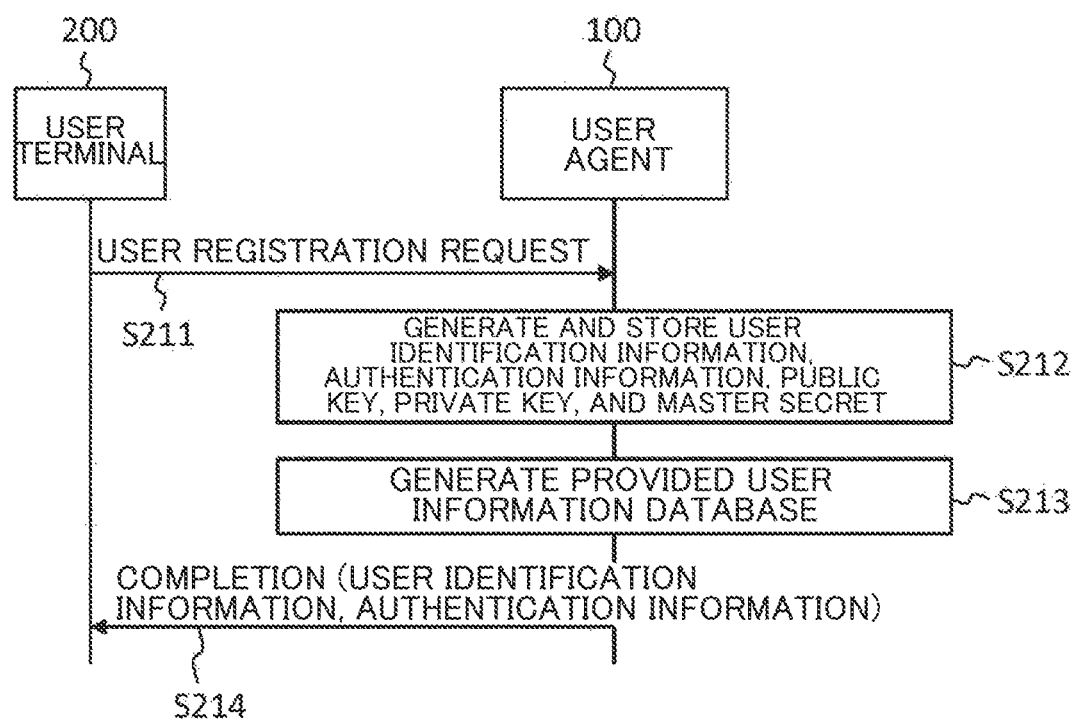
FIG. 10 is a sequence diagram of user registration processing with the user agent of the user according to the present embodiment.

FIG. 10 is a sequence diagram of user registration processing with the user agent 100 of the user according to the present embodiment. The processing contents of step S120 (see FIG. 2) will be described with reference to FIG. 10. It is assumed that the communication between the user terminal 200 and the user agent 100 is encrypted, and the user terminal 200 authenticates the user agent 100 with which it communicates.

In step S211, the user registration unit 212 of the user terminal 200 requests the user agent 100 to register the user. In step S212, the user registration unit 112 of the user agent 100 generates the identification information of the user (user identification information), authentication information, a pair of public and private keys, and a master secret. Next, the user registration unit 112 adds a record to the registered user database 130, and stores the generated user identification information, authentication information, a public key, a private key, and master secret as the user identification information 131 and the authentication information 132, the public key 133, the private key 134, and the master secret 135 of the added record, respectively. The authentication information is authentication information of the user terminal 200 used when the user terminal 200 accesses the user agent 100 after the user registration processing.

In step S213, the user registration unit 112 generates an empty provided user information database 140. Next, the user registration unit 112 stores the identification information of the provided user information database 140 in provided user information 137 of the record added in the step S212. In step S214, the user registration unit 112 transmits the user identification information and the authentication information generated in the step S212 to the user terminal 200, and notifies that the user registration is completed. The user terminal 200 stores the user identification information and the authentication information in the storage unit 220. Thereafter, when the user terminal 200 accesses the user agent 100, the authentication information is used.

<<Registration Processing of User Information>>

Figure 11:
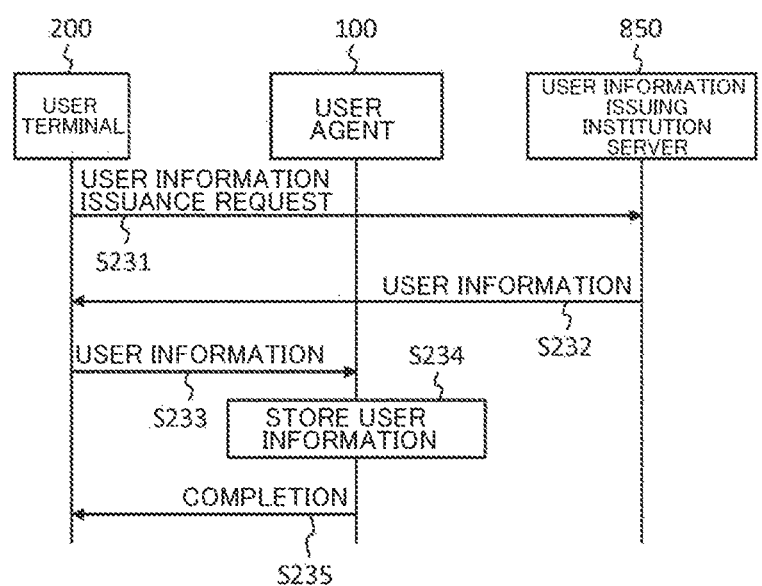
FIG. 11 is a sequence diagram of user information registration processing according to the present embodiment.

FIG. 11 is a sequence diagram of user information registration processing according to the present embodiment. The processing contents of step S130 (see FIG. 2) will be described with reference to FIG. 11. In processing of FIG. 11, it is assumed that the communication between the user terminal 200 and the user information issuing institution server 850 is encrypted and the opposite party is mutually authenticated.

In step S231, the user information registration unit 213 of the user terminal 200 requests the user information issuing institution server 850 to issue user information. The request includes a type of user information to be issued.

In step S232, the user information issuing institution server 850 generates user information and transmits the user information to the user terminal 200.

In step S233, the user information registration unit 213 transmits the user information received in the step S232 to the user agent 100.

In step S234, the user information registration unit 113 of the user agent 100 stores the user information received in step S233 in the registered user database 130. More specifically, the user information registration unit 113 specifies a record of the registered user database 130 (see FIG. 4) corresponding to the user of the user terminal 200. Next, the user information registration unit 113 adds the user information received in the step S233 to the user information 136.

In step S235, the user information registration unit 113 notifies the user terminal 200 of the completion of the registration.

<<User's Registration Processing to Service>>

Figure 12:
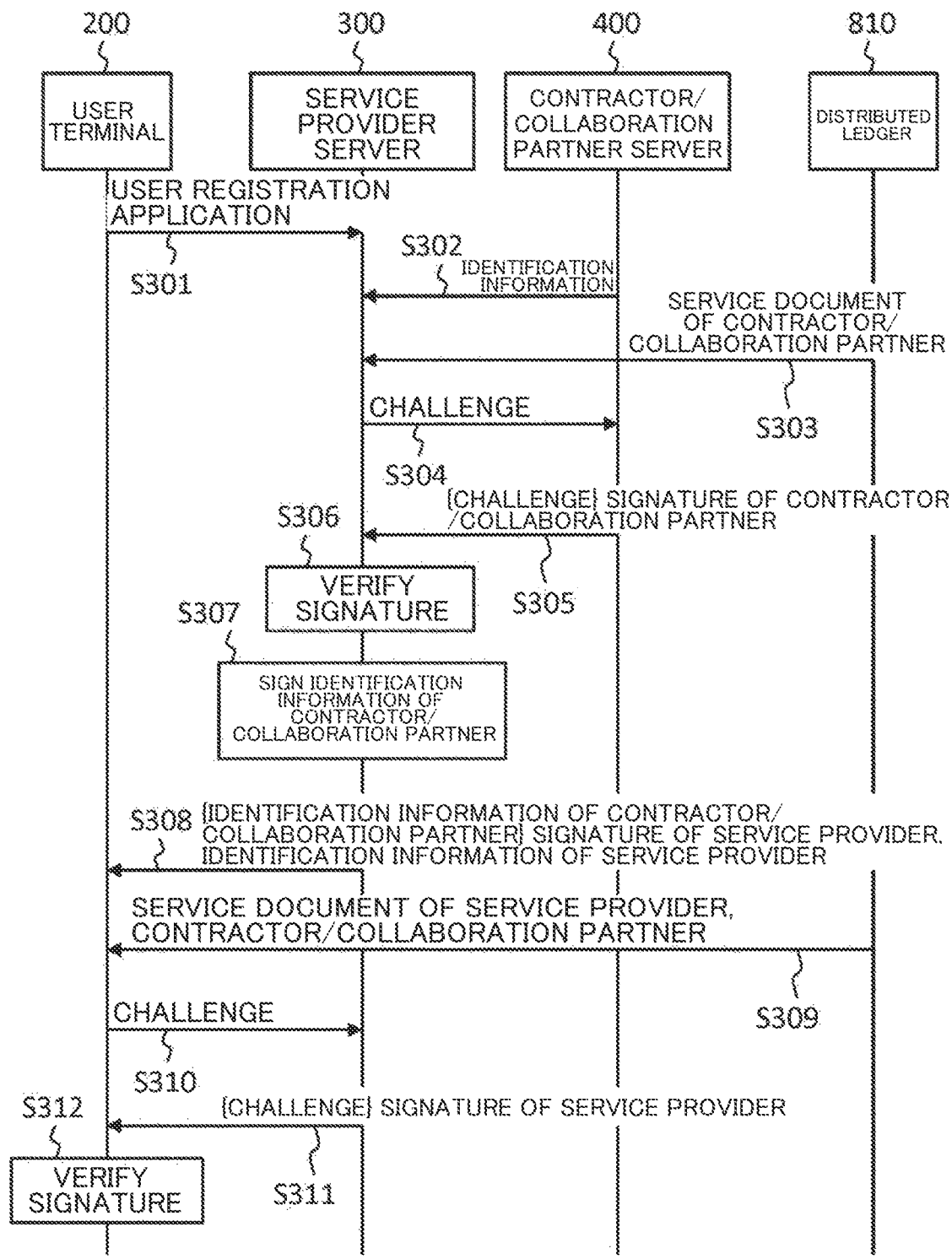
FIG. 12 is a sequence diagram (1) of user's service registration processing according to the present embodiment.

FIG. 12 is a sequence diagram (1) of user's service registration processing according to the present embodiment.

Figure 13:
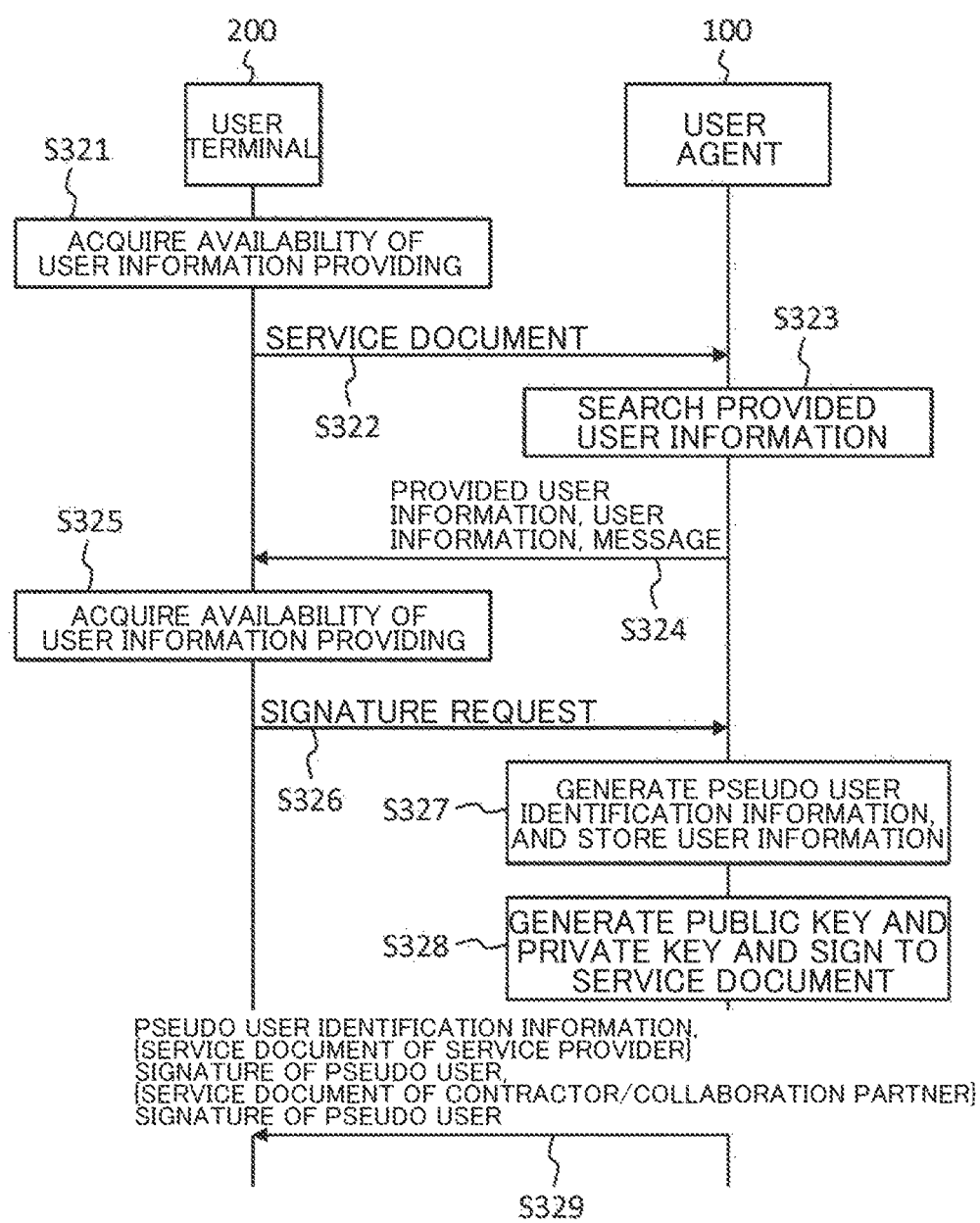
FIG. 13 is a sequence diagram (2) of user's service registration processing according to the present embodiment.

FIG. 13 is a sequence diagram (2) of user's service registration processing according to the present embodiment.

Figure 14:
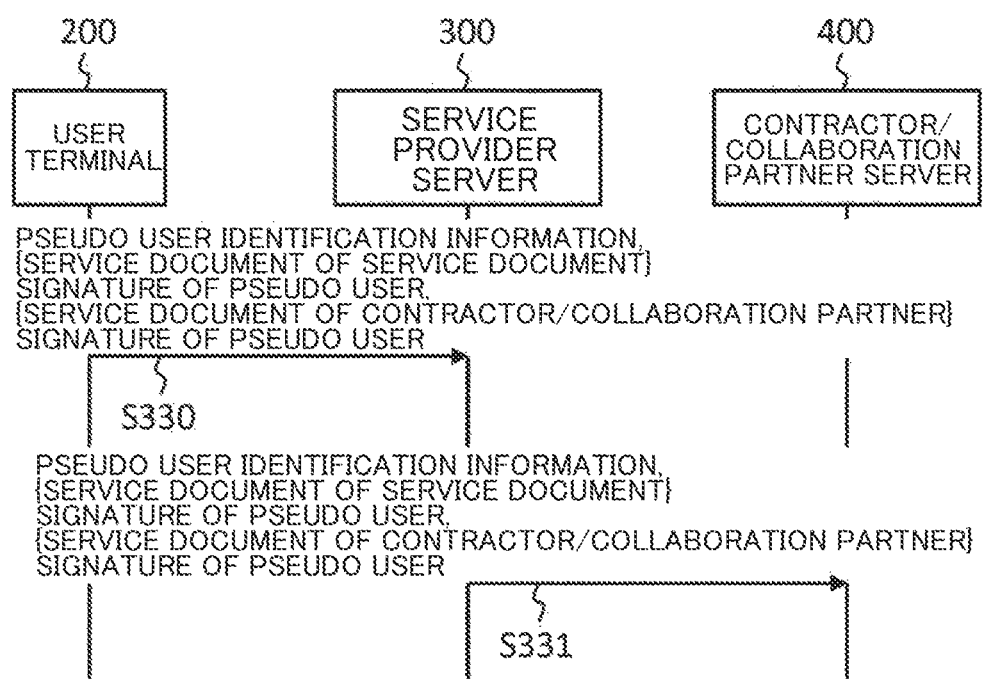
FIG. 14 is a sequence diagram (3) of user's service registration processing according to the present embodiment.

FIG. 14 is a sequence diagram (3) of user's service registration processing according to the present embodiment.

The processing contents of steps S141 to S143 (see FIG. 2) will be described with reference to FIGS. 12 to 14. In FIG. 12 to FIG. 18, the service provider server 300 and the contractor/collaboration partner server 400 are sometimes abbreviated as the service provider and contractor/collaboration partner, respectively.

In step S301, the service application unit 214 of the user terminal 200 applies for registration to the service of the user to the service provider server 300.

In step S302, the user registration unit 313 of the service provider server 300 acquires identification information of the contractor/collaboration partner server 400 from the contractor/collaboration partner server 400.

In step S303, the user registration unit 313 acquires the service document of the contractor/collaboration partner server 400 from the distributed ledger 810 based on the identification information acquired in the step S302.

In step S304, the user registration unit 313 transmits the challenge (random number) generated by the key management unit 311 to the contractor/collaboration partner server 400.

In step S305, the key management unit (see the key management unit 311 illustrated in FIG. 7) of the contractor/collaboration partner server 400 uses its own private key (private key corresponding to the public key in the service document) to generate a signature for the challenge and transmits a signed challenge to the service provider server 300.

In a case where in the drawing "{data} signature of subject" is denoted, it shows "data" to which a signature generated using a private key of "subject" such as the service provider server 300 or a user is attached. For example, "{challenge} signature of contractor/collaboration partner" indicates a challenge with a signature generated using the private key of the contractor/collaboration partner server 400.

In step S306, the user registration unit 313 verifies the signature of the challenge acquired in the step S305 using the public key of the contractor/collaboration partner server 400 included in the service document acquired in the step S303. When the verification is successful, the service provider server 300 authenticates the contractor/collaboration partner server 400. When the verification fails, the user registration unit 313 notifies the user terminal 200 of an error, and stops the processing illustrated in FIG. 12. Now, description is continued on the assumption that the authentication has succeeded.

In step S307, the user registration unit 313 requests the key management unit 311 to sign the identification information of the contractor/collaboration partner server 400 with its own private key.

In step S308, the user registration unit 313 transmits identification information of the contractor/collaboration partner server 400 with the signature and identification information of the service provider server 300 to the user terminal 200.

In step S309, the service application unit 214 of the user terminal 200 acquires service documents of the contractor/collaboration partner server 400 and the service provider server 300 from the distributed ledger 810 based on the identification information received in the step S308.

In step S310, the service application unit 214 transmits the challenge (random number) generated by the key management unit 211 (see FIG. 6) to the service provider server 300.

In step S311, the key management unit 311 (see FIG. 7) of the service provider server 300 generates a signature for the challenge using its own private key (private key corresponding to the public key in the service document) and transmits a signed challenge to the user terminal 200.

In step S312, the service application unit 214 verifies the signature of the service provider server 300 given to the challenge acquired in the step S311 using the public key included in the service document of the service provider server 300 acquired in the step S309. When the verification is successful, the user terminal 200 authenticates the service provider server 300.

Then, the service application unit 214 verifies the signature of the service provider server 300 given to the identification information of the contractor/collaboration partner server 400 acquired in the step S308. When the verification is successful, it can be confirmed that the contractor/collaboration partner server 400 exists as the contractor of the service provider server 300, and that the authentic identification information of the contractor/collaboration partner server 400 is obtained.

When the verification of any signature fails, the service application unit 214 notifies the service provider server 300 of an error and stops the processing illustrated in FIG. 12. Now, description is continued on the assumption that the verification of the signature has succeeded.

The processing of the step S301 to S312 corresponds to the processing of the registration application described in the step S141 (FIG. 2).

Moving to FIG. 13, in step S321, the user information provision request unit 215 of the user terminal 200 inquires a user to acquire the availability of providing the user information. More specifically, the user information provision request unit 215 displays the type of user information (user information type) described in the service document acquired in step S309 (see FIG. 12), and inquires of the user whether the user information requested by the service provider server 300 and the contractor/collaboration partner server 400 can be provided (whether access is approved). If it is impossible, the user information provision request unit 215 notifies the service provider server 300 of an error and stops the processing shown in FIG. 13. The following description is assumed to be accepted.

In step S322, the user information provision request unit 215 transmits the service documents of the service provider server 300 and the contractor/collaboration partner server 400 to the user agent 100. By transmitting the service document, the user terminal 200 requests the user agent 100 for user information already provided to the service provider server 300 and the contractor/collaboration partner server 400.

In step S323, the user information providing destination search unit 114 of the user agent 100 searches the provided user information. More specifically, the user information providing destination search unit 114 searches a record including identification information of the service provider server 300 and the contractor/collaboration partner server 400 included in the service document acquired in the step S322, in the providing destination 143, among records of the provided user information database 140 (see FIG. 5) related to a user of the user agent 100. The user information 142 of the record is already provided user information.

In step S324, the user information providing availability determination unit 115 transmits the provided user information, the registered user information (the user information 136 illustrated in FIG. 4, see FIG. 11), and the message to the user terminal 200. More specifically, the user information providing availability determination unit 115 transmits the user information already provided to the service provider server 300 acquired in the step S323 and the anonymized (abstracted) user information corresponding to the user information type included in the service document of the service provider server 300 acquired in the step S322 to the user terminal 200. In addition, the user information providing availability determination unit 115 similarly transmits the provided user information and the user information to the contractor/collaboration partner server 400.

The message is a message generated by the user information providing availability determination unit 115, and is a message for a user displayed in a provision user information confirmation screen 600 described later (see FIG. 15 described later). The message includes information regarding the risk of name identification.

In step S325, the user information provision request unit 215 of the user terminal 200 inquires a user and acquires the availability of providing the user information to the service provider server 300 and the contractor/collaboration partner server 400. The user information provision request unit 215 displays the provision user information confirmation screen 600, which will be described late (see FIG. 15 described later) on a display (not shown) connected to the input/output unit 250, and inquires the user information providing.

In step S321, the user information provision request unit 215 displays the user information type and inquires the availability of providing the user information corresponding to the user information type. On the other hand, in step S325, the user information provision request unit 215 displays the user information itself and inquires the availability of providing the user information.

FIG. 15 is a configuration diagram of the provision user information confirmation screen 600 according to the present embodiment. At the center of the provision user information confirmation screen 600, a provision user information list 610 including provided user information acquired and user information registered in step S324 is displayed. In the provision user information list 610 illustrated in FIG. 15, it is shown that a name, an address, and a date of birth are provided to the service provider server 300, and a name, an address, and a date of birth are provided to the contractor/collaboration partner server 400. It also indicates that the address and date of birth have already been provided to the contractor/collaboration partner server 400.

A text 620 "A contractor B . . . you . . . " below the provision user information list 610 is the message sent by the user information providing destination search unit 114 in step S324. When user information has already been provided to the contractor/collaboration partner server 400 and in the user registration processing for the current service (see FIGS. 12 to 14), and furthermore, in a case where the same user information as the provided user information is provided, the user information providing availability determination unit 115 of the user agent 100 generates a message that there is a risk of name identification. In addition, even if the user information items are not the same and even if the granularity (abstraction) is different, such as "Tokyo" and "Minami-ku, Tokyo," a message is generated indicating that there is a risk of name identification (see step S324). The user information providing availability determination unit 115 similarly generates a message for user information to be provided to the service provider server 300.

The user refers to the provision user information list 610 and the text 620 to determine whether to provide the user information. The user presses a "providing" button 631 in a case of providing, and presses a "not providing" button 632 in a case of not providing.

In a case where the "not providing" button 632 is pressed, the user information provision request unit 215 notifies the user agent 100 of the processing stop, and stops the processing illustrated in FIG. 13. Hereinafter, it is assumed that the "providing" button 631 has been pressed, and the description will be continued.

Returning to FIG. 13, the user information provision request unit 215 requests a signature to the service document in step S326. The request may include user information (providing permission user information) for permitting provision to the service provider server 300 and the contractor/ collaboration partner server 400, respectively. Requesting the signature to the service document indicates that the user (user terminal 200) permits the service provider server 300 and the contractor/collaboration partner server 400 to provide the user of the user information, in other words, approves the access right.

The processing of the above step S321 to S326 corresponds to the processing of the user information provision request in step S142 (illustrated in FIG. 2).

In step S327, the user information access right approval unit 116 generates pseudo user identification information. The pseudo user identification information is user identification information registered in the service provider server 300 or the contractor/collaboration partner server 400 (refer to the user identification information 331 illustrated in FIG. 8).

The user information access right approval unit 116 adds a new record to the registered user database 130 (FIG. 4), and stores the generated pseudo user identification information in the user identification information 131. Also, user information to be provided is stored in the user information 136. Then, a new record is added to the provided user information database 140 corresponding to the user of the user terminal 200. The user information access right approval unit 116 stores the providing destination (identification information of the service provider server 300 or the contractor/collaboration partner server 400) and pseudo user identification information in the providing destination 143 of the record. In addition, the user information access right approval unit 116 stores user information to be provided and its type in user information 142 and the type 141 of the record, respectively.

The user information 142 is user information that is obtained by converting (coarse granulating/abstracting) the user information to be stored in the registered user database 130 (see FIG. 4), included in the user information 136 stored in the user record, and in accordance with the user information type included in the service document (refer to step S322) and anonymizing the user information according to the user information type included in the service document. For example, if the user information included in the service document is the residence prefecture, the address including the house number in the user information 136 is anonymized as an address of only the prefecture. The user information providing unit 117 performs the processing of converting and anonymizing the user information according to the user information type.

In step S328, the user information access right approval unit 116 requests the key management unit 111 to generate the public key and the private key. Next, the user information access right approval unit 116 stores the keys in the public key 133 and the private key 134 of the record added to the registered user database 130 in step S327, respectively. The public key and the private key are the public key and the private key corresponding to the pseudo user identification information. Subsequently, the user information access right approval unit 116 signs the service document acquired in step S322 with the private key corresponding to the pseudo user identification information.

In step S329, the user information access right approval unit 116 transmits the pseudo user identification information, the service document of the service provider server 300 to which the signature is given, and the service document of the contractor/collaboration partner server 400 to which the signature is given to the user terminal 200.

Moving to FIG. 14, in step S330, the service document transfer unit 216 of the user terminal 200 transmits the pseudo user identification information received in step S329, the service document of the service provider server 300 to which the signature is given, and the service document of the contractor/collaboration partner server 400 to which the signature is given to the service provider server 300. When the pseudo user identification information is received, the user registration unit 313 of the service provider server 300 adds a new record to the service user database 330 stored by itself. Next, the user registration unit 313 stores the received pseudo user identification information in the user identification information 331.

In step S331, the related service document transfer unit 315 of the service provider server 300 transmits the pseudo user identification information received in step S330, the service document of the service provider server 300 to which the signature is given, and the service document of the contractor/collaboration partner server 400 to which the signature is given to the contractor/collaboration partner server 400. When the pseudo user identification information is received, the user registration unit 313 of the contractor/collaboration partner server 400 adds a new record to the service user database 330 stored by itself. Next, the user registration unit 313 stores the received pseudo user identification information in the user identification information 331.

At this point of time, the service provider server 300 and the contractor/collaboration partner server 400 respectively have their own service documents to which the signature of the pseudo user is given. The service document includes the identification information of the service provider server 300 or the contractor/collaboration partner server 400, the public key, and the user information type to be requested, and the signature of a pseudo user is given to them. Thus, the user agent 100 referring to the signed service document can confirm that the user of the user terminal 200 has permitted the access right to the user information for the service provider server 300 or the contractor/collaboration partner server 400 authenticated by the public key.

The processing of the step S327 to S331 corresponds to the processing of approval of the access right described in step S143 (illustrated in FIG. 2).

<<Acquisition Processing of User Information>>

FIG. 16 is a sequence diagram of user information acquisition processing of the service provider server 300 according to the present embodiment. The processing contents of step S144 (see FIG. 2) of the service provider server 300 will be described with reference to FIG. 16.

In step S341, the user information acquisition unit 314 of the service provider server 300 transmits the pseudo user identification information and its own service document to which the signature of the pseudo user is added to the user agent 100.

In step S342, the user information providing unit 117 of the user agent 100 transmits the challenge (random number) generated by the key management unit 111 to the service provider server 300.

In step S343, the key management unit 311 of the service provider server 300 (see FIG. 7) generates a signature for the challenge using its own private key (private key corresponding to the public key in the service document), and transmits a challenge with the sign to the user agent 100.

In step S344, the user information providing unit 117 of the user agent 100 verifies the signature of the signed service document received in the step S341. For verification, the public key 133 of the record included in the registered user database 130 (see FIG. 3) and whose user identification information 131 is the pseudo user identification information received in step S341 is used. Next, the user information providing unit 117 verifies the signature given to the challenge using the public key included in the signed service document received in the step S341. When the verification is successful, the user information providing unit 117 authenticates the service provider server 300. When the verification of two signatures are successful, the user information providing unit 117 can confirm that the service provider server 300 has an access right to the user information. In a case where any of the signature verification fails, the user information providing unit 117 notifies the service provider server 300 of an error, and finishes the processing illustrated in FIG. 16.

In step S345, the user information providing unit 117 transmits the anonymized user information to the service provider server 300. More specifically, the user information providing unit 117 acquires the user information corresponding to the user information (user information type) included in the service document from the user information 142 (see FIG. 5 and step S327 in FIG. 13).

In step S346, the user information acquisition unit 314 of the service provider server 300 stores the received user information in user information 333 of the service user database 330 (see FIG. 8). More specifically, the user information acquisition unit 314 stores the received user information in the user information 333 of the record corresponding to the pseudo user identification information in the service user database 330.

In step S347, the user information providing unit 117 registers a user information providing history (offer history) in the distributed ledger 810. More specifically, the user information providing unit 117 registers a history including the date and time, the identification information of the service provider server 300, the type of acquired user information (user information (user information type) described in the service document, such as the residence prefecture), and the pseudo user identification information.

Figure 17:
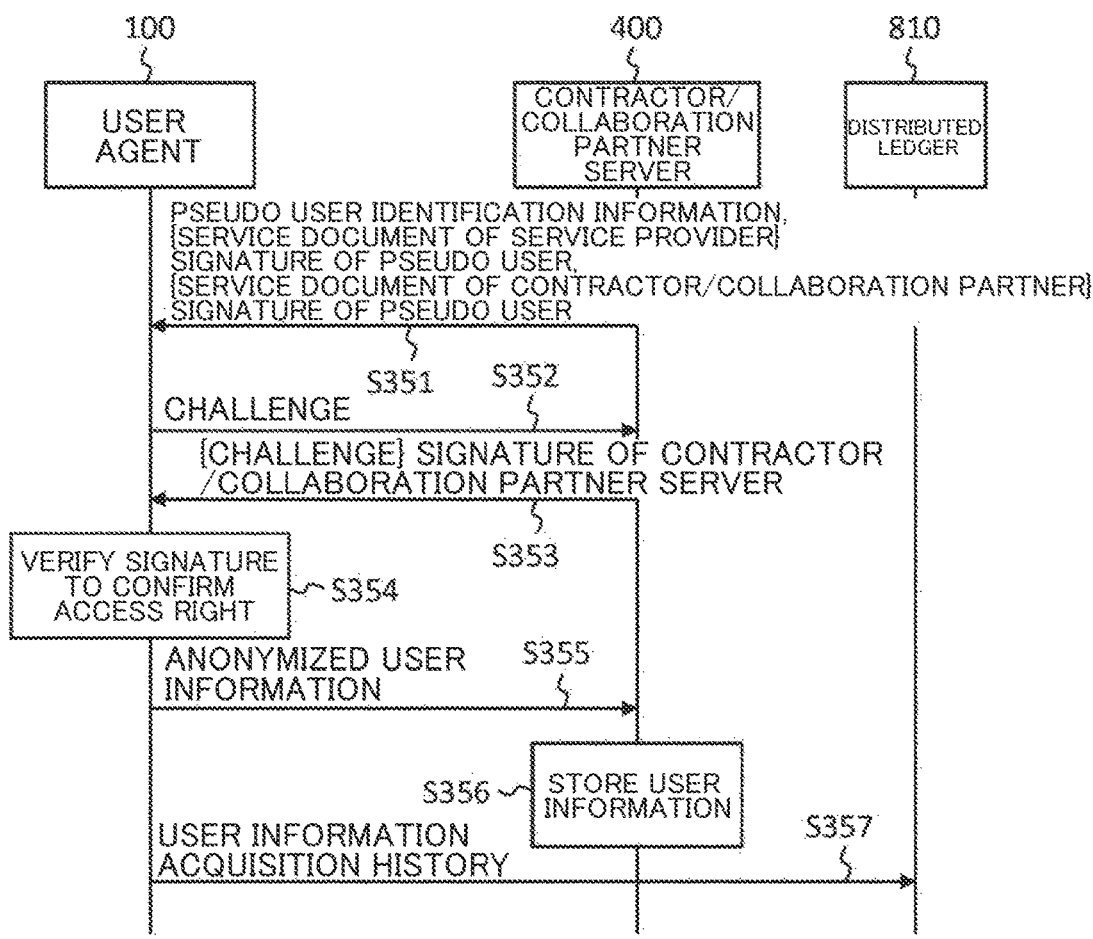
FIG. 17 is a sequence diagram of user information acquisition processing of a contractor/collaboration partner server according to the present embodiment.

FIG. 17 is a sequence diagram of user information acquisition processing of the contractor/collaboration partner server 400 according to the present embodiment. The processing of FIG. 17 is substantially the same as the processing of FIG. 16 in which the service provider server 300 is replaced with the contractor/collaboration partner server 400. Differences from the processing in FIG. 16 will be described below.

In step S351, the user information acquisition unit 314 of the contractor/collaboration partner server 400 transmits the pseudo user identification information received in step S331 (see FIG. 14), the service document of the service provider server 300 to which the signature is given, and the service document of the contractor/collaboration partner server 400 to which the signature is given to the contractor/collaboration partner server 400.

In step S354, the user information providing unit 117 of the user agent 100 verifies the signatures of the two service documents received in the step S351 and the signature of the challenge received in the step S353 in the same manner as in the step S344. Further, it is confirmed that the service document of the service provider server 300 includes identification information of the contractor/collaboration partner server 400 as the contractor/collaboration partner. By successfully verifying the three signatures and confirming the identification information, the user information providing unit 117 can confirm that the contractor/collaboration partner server 400 is the contractor/collaboration partner of the service provider server 300 and has an access right to the user information.

<<Features of User Information Management System>>

In the user information management system 10, the service document of the service provider server 300 includes a type of user information necessary for service provision in addition to the identification information and the public key of the service provider server 300. When the user registers with the service provider server 300 (applying for registration of the user for a service), the user determines whether the service provider server 300 can access the user information (user information type) described in the service document (see step S321 in FIG. 13). When the access is possible, the user terminal 200 transmits the service document to the user agent 100 (see step S322).

The user refers to the already provided user information searched by the user agent 100 (see steps S323 and S324), and determines the availability of providing the user information including the risk of name identification (step S325, refer to the provision user information confirmation screen 600 illustrated in FIG. 15). If it can be provided, the user agent 100 generates the pseudo user information and signs the service document using the secret key of the pseudo user (see step S328). In addition, the user agent 100 stores the anonymized (abstracted) user information as user information to be provided in the provided user information database 140 (see step S327). The signed service document indicates that the service provider server 300 or the contractor/collaboration partner server 400 has the right to access the user information (approved).

When the user information is requested from the service provider server 300 or the contractor/collaboration partner server 400 together with the signed service document, the user agent 100 verifies the signature of the service document and confirms that there is an access right (refer to steps S344 and S354), and then transmits the stored user information. The identification information of the user provided and registered to the service provider server 300 is pseudo user identification information (see FIGS. 14, 16, and 17). The pseudo user identification information is generated for each user registration to the service (refer to step S327 illustrated in FIG. 13), and avoids a name identification by the user identification information.

Further, before signing the service document, the user agent 100 provides the user information already provided to the service provider server 300 and the contractor/collaboration partner server 400 and the risk of name identification to the user, and inquires whether to provide the information (steps S324 and S325, see FIG. 15). The user can determine the availability of providing the user information in consideration of the presence or absence of the risk of name identification and the magnitude (level) of the risk. As a result, in addition to avoiding name identification using user identification information, the possibility of name identification using user information is reduced. The provided user information is anonymized (abstracted) to further reduce the possibility of name identification. Therefore, it is possible to reduce privacy violations due to name identification that the user is not aware of.

Modification Example: Selection of User Information to be Provided

In the provision user information confirmation screen 600 in the above embodiment (see FIG. 15), the user selects whether to provide the user information. On the other hand, in a case where there are a plurality of pieces of user information of the same type, the user information to be provided may be selected by the user.

FIG. 18 is a configuration diagram of a provision user information confirmation screen 600A according to a modification example of the present embodiment. In comparison with the provision user information list 610 (see FIG. 15), the provision user information list 610A has a column (row) of "providing availability". In a case where there are a plurality of pieces of user information for a type of one piece of user information, a check is made in a column of "providing availability," so that a user can select user information to be provided (also referred to as provision permitted user information, service provider server provision permission user information, and related service provider server provision permission user information). The user terminal 200 transmits the user information to the user agent 100 and requests a signature to the service document (refer to step S326 in FIG. 13). In this way, the user can select his or her desired means from a plurality of means (selectable user information) that reduce the risk of name identification.

Modification Example: Contractor/Collaboration Partner

In the above-described embodiment, in step S354 (see FIG. 17), the user agent confirms that the service document of the service provider server 300 includes the contractor/collaboration partner server 400 as a contractor/collaboration partner server. This is not limited to this, but it may be confirmed at other timing. For example, the user terminal 200 may confirm at step S312 (see FIG. 12). (In addition, the user agent 100 may confirm after receiving the service document in step S322 (see FIG. 13) or after receiving the signature request in step S326.

Other Modification Examples

The present invention is not limited to the above-mentioned embodiments, and can be changed within a range that does not depart from the gist of the present invention. For example, in the above-described embodiment, the user information is provided to two servers, namely, the service provider server 300 and the contractor/collaboration partner server 400, but the user information may be provided to three or more servers or one server of the service provider server 300. Even in a case where the user information is provided to a server A as the service provider and a server B as the contractor in the past and the user information is newly provided to the server B as the service provider, the user information can be provided in consideration of the risk of name identification.

In the above-described embodiment, the service document of the service provider server 300 to which the signature by the private key of the pseudo user is given is sent from the user agent 100 to the service provider server 300 via the user terminal 200. In addition, the service document of the contractor/collaboration partner server 400 is sent from the user agent 100 to the contractor/collaboration partner server 400 via the user terminal 200 and the service provider server 300. The service document may be sent on other paths. For example, the user agent 100 may directly send the service document to the service provider server 300 or the contractor/collaboration partner server 400.

In the above embodiment, the user agent 100 generates the texts 620, 620A displayed on the provision user information confirmation screens 600 and 600A (refer to step S324 illustrated in FIG. 13). Instead of the user agent 100, the user terminal 200 may generate the texts 620 and 620A based on the provided user information and the user information received in the step S324.

In step S312 (FIG. 12), step S344 (FIG. 16), and step S354 (FIG. 17), the contractor/collaboration partner included in a plurality of signatures and service documents are verified, but there is no particular restriction on the order of verification. For example, in step S354, the user information providing unit 117 confirms that signatures of two service documents, a signature of the challenge received in the step S353, and identification information of the contractor/collaboration partner server 400 is included in a service document of the service provider server 300 as the contractor/collaboration partner. However, there are no particular restrictions on the order of these.

In the above, some embodiments of the present invention have been described, but those embodiments are just examples, and do not limit the technical scope of the present invention. The present invention can take various other embodiments, and various modifications such as omission and substitution can be made without departing from the gist of the present invention.

These embodiments and modifications thereof are included in the scope and gist of the invention described in the present specification and the like and are also included in the scope of the invention described in the claims and the equivalent scope thereof.

<<Hardware Configuration>>

Figure 19:
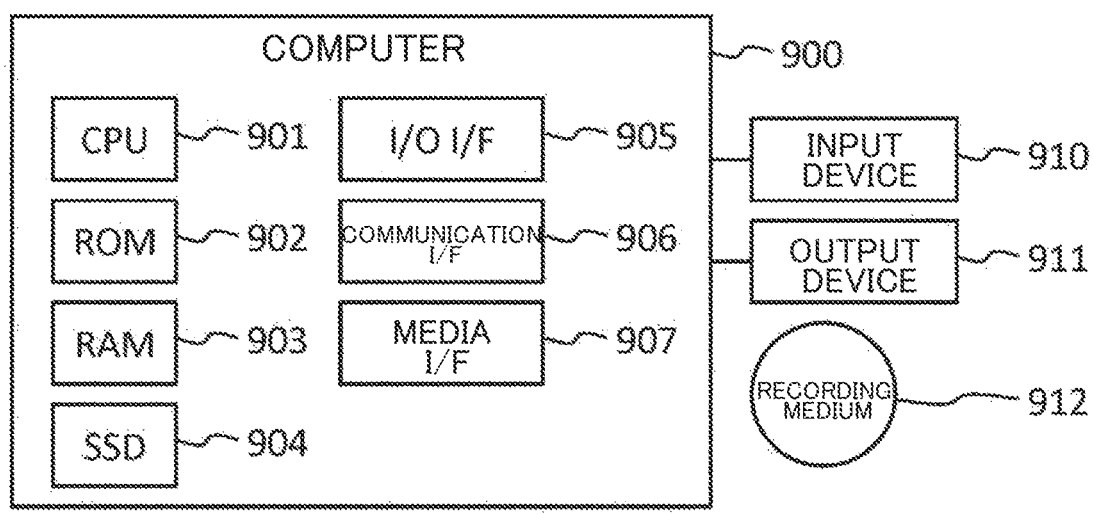
FIG. 19 is a hardware configuration diagram illustrating an example of a computer that implements functions of the user agent according to the present embodiment.

FIG. 19 is a hardware configuration diagram illustrating an example of a computer 900 that implements functions of the user agent 100 according to the present embodiment. The user agent 100 according to the present embodiment is realized by, for example, the computer 900 having a configuration as illustrated in FIG. 19. The computer 900 has a CPU 901, a ROM 902, a RAM 903, an SSD 904, an input/output interface 905 (described as input/output interface (I/O I/F) in FIG. 19), a communication interface 906, and media interface 907.

The CPU 901 operates based on a program stored in the ROM 902 or the SSD 904 and performs control by the control unit 110 in FIG. 3. The ROM 902 stores a boot program executed by the CPU 901 when the computer 900 is started, a program related to the hardware of the computer 900, and the like.

The CPU 901 controls an input device 910 such as a mouse and a keyboard and an output device 911 such as a display and a printer via the input/output interface 905. The CPU 901 acquires data from the input device 910 and outputs generated data to the output device 911 via the input/output interface 905.

The SSD 904 stores programs executed by the CPU 901, data used by the programs, and the like. The communication interface 906 receives data from other devices (for example, the user terminal 200, the service provider server 300, or the like) via a communication network and outputs the data to the CPU 901 and transmits the data generated by the CPU 901 to another device (not illustrated) via a communication network.

The media interface 907 reads the program or the data stored in a recording medium 912 and outputs the read program or data to the CPU 901 via the RAM 903. The CPU 901 loads the program from the recording medium 912 on the RAM 903 via the media interface 907 and executes the loaded program. The recording medium 912 is an optical recording medium such as a digital versatile disk (DVD), a magneto-optical recording medium such as a magneto-optical disc (MO), a magnetic recording medium, a conductor memory tape medium, a semiconductor memory, or the like.

For example, in a case where the computer 900 serves as the user agent 100 according to the present embodiment, the CPU 901 of the computer 900 realizes the function of the user agent 100 by executing the program 121 (see FIG. 3) loaded on the RAM 903. The CPU 901 reads the program from the recording medium 912 and executes the program. In addition, the CPU 901 may read a program from another device via a communication network or may install the program 121 from the recording medium 912 to the SSD 904 and execute the program 121.

Effects

The effects of the user information management system 10 will be described below.

The user information management system 10 according to the present embodiment is the user information management system 10 including the user terminal 200 used by a user, the user agent 100, and the service provider server 300, in which the user agent 100 includes the storage unit 120 that stores the registered user database 130 in which user identification information 131 of the user and user information 136 of the user are stored in association with each other, and the provided user information database 140 in which the service provider server 300 (refer to the providing destination 143) and user information 142 provided to the service provider server 300 are stored in association with each other, the user information providing destination search unit 114 that receives a request from the user terminal 200 with the service provider service document including identification information of the service provider server 300 and the user information type that is a type of user information requested by the service provider server 300, and transmits user information of the user of the user terminal 200 already provided to the service provider server 300 and user information of the user corresponding to the user information type to the user terminal 200, and the user information access right approval unit 116 that receives service provider server provision permission user information indicating user information to be provided to the service provider server 300 from the user terminal, generates pseudo user identification information (refer to the user identification information 131) that is user identification information 331 of the user in the service provider server 300 and a pair of the private key 134 and the public key 133 associated with the pseudo user identification information, generates the signed service provider service document obtained by adding the signature to the service provider service document using the private key 134, and transmits the pseudo user identification information and the signed service provider service document to the user terminal 200, the user terminal 200 includes the user information provision request unit 215 that transmits the service provider server provision permission user information to the user agent 100, and the service document transfer unit 216 that transmits the pseudo user identification information and the signed service provider service document to the service provider server 300, the service provider server 300 includes the user information request unit (the user information acquisition unit 314) that transmits the pseudo user identification information and the signed service provider service document to the user agent 100, and the user agent 100 further includes the user information providing unit 117 that verifies the signature of the signed service provider service document using the public key 133 associated with the pseudo user identification information, and returns the service provider server provision permission user information (refer to the user information 142) to the service provider server in a case where the verification is successful.

According to such the user information management system 10, the service provider server 300 can acquire the user information of the user corresponding to the user information type described in the service document signed with the user's private key (see FIG. 16). In addition, the user terminal 200 can provide a user with an opportunity to determine the availability of providing the user information.

More specifically, when the user terminal 200 requests the user agent 100 (the user information access right approval unit 116) to add a signature to the service document, the user refers to the user information type described in the service document and the availability of providing the user information can be determined (refer to step S321 in FIG. 13).

The user information providing destination search unit 114 of the user agent 100 searches for the provided user information and transmits the information to the user terminal 200 (refer to steps S323 and S324). The user can refer to the user information that has already been provided and determine the availability of providing the user information in consideration of the risk of name identification (refer to step S325).

The user information management system 10 according to the present embodiment further includes a related service provider server (the contractor/collaboration partner server 400) that provides a service in cooperation with the service provider server 300, in which the related service provider server includes a related user information request unit (the user information acquisition unit 314), the service provider server 300 further includes the related service document transfer unit 315, in the service provider service document, the identification information of the related service provider server is further included, in the provided user information database 140, the related service provider server (refer to the providing destination 143) and the user information 142 provided to the related service provider server are stored in association with each other, the user information providing destination search unit 114 of the user agent 100 receives a request from the user terminal 200 with a related service provider service document including identification information of the related service provider server and a user information type requested by the related service provider server and transmits user information of a user of the user terminal 200 already provided to the related service provider server to the user terminal 200, the user information provision request unit 215 of the user terminal 200 transmits related service provider server provision permission user information indicating user information to be provided to the related service provider server to the user agent 100, the user information access right approval unit 116 of the user agent 100 generates a signed related service provider service document obtained by adding a signature to the related service provider service document using the private key 134, and transmits the pseudo user identification information and the signed service provider service document to the user terminal 200, the service document transfer unit 216 included in the user terminal 200 further transmits the signed related service provider service document to the service provider server 300, the related service document transfer unit 315 of the service provider server 300 transmits the pseudo user identification information, the signed service provider service document, and the signed related service provider service document to the related service provider server, the related user information request unit (the user information acquisition unit 314) of the related service provider server transmits the pseudo user identification information, the signed service provider service document, and the signed related service provider service document to the user agent 100, and the user information providing unit 117 of the user agent 100 verifies a signature of the signed service provider service document using the public key 133 associated with the pseudo user identification information, in a case where the verification is successful, verifies that identification information of the related service provider server is included in the signed service provider service document, in a case where the verification is successful, verifies an signature of the signed related service provider service document using the public key 133 associated with the pseudo user identification information, and in a case where the verification is successful, returns the related service provider server provision permission user information (refer to the user information 142) to the related service provider server.

According to such the user information management system 10, it is possible to cope with a case where not only the service provider server 300 alone, but also the service provider server 300 and the related service provider server (the contractor/collaboration partner server 400) provide a service in cooperation with each other. More specifically, the related service provider server can also acquire the user information. The user terminal 200 can provide a user with an opportunity to determine the availability of providing the user information to the related service provider server. The user can determine the availability of providing the user information by referring to the user information type described in the service document and the provided user information including the related service provider server.

The user information providing unit 117 of the user agent 100 according to the present embodiment acquires the service provider server provision permission user information from the registered user database 130, abstracts the service provider server provision permission user information into the user information corresponding to a user information type included in a signed service provider service document, and returns the abstracted user information to the service provider server 300.

According to such the user information management system 10, the user agent 100 returns not the user information itself stored in the registered user database 130, but the abstracted user information of coarse granularity corresponding to the user information type described in the service document to the service provider server 300 (refer to step S327 of FIG. 13 and step S345 of FIG. 16). The minimum user information required for service provision, described in the service document, is provided. Therefore, even if user information is leaked out from the service provider server 300, the amount of information flowing out can be minimized, and damage can be minimized. In addition, the possibility of name identification using the user information can be reduced, and the risk of name identification can be reduced.

The user information provision request unit 215 of the user terminal 200 according to the present embodiment displays the provision user information confirmation screen 600 including at least one of user information already provided to the service provider server 300, user information to be provided to the service provider server 300, user information already provided to a related service provider server, and user information to be provided to a related service provider server to acquire the service provider server provision permission user information.

According to such the user information management system 10, the user terminal 200 can present user information to be provided to the service provider server 300 and provided user information to a user. The user can determine the availability of providing the user information based on the presented information.

REFERENCE SIGNS LIST

10 User information management system
100 user agent
110 Control unit
111 Key management unit
112 User registration unit
113 User information registration unit
114 User information providing destination search unit
115 User information providing availability determination unit
116 User information access right approval unit
117 User information providing unit
120 Storage unit
130 Registered user database
131 User identification information (pseudo user identification information)
133 Public key
134 Private key
136 User information
140 Provided user information database
142 User information
143 Providing destination
150 Communication unit
200 User terminal
215 User information provision request unit
216 Service document transfer unit
300 Service provider server
314 User information acquisition unit (user information request unit, related user information request unit)
315 Related service document transfer unit
400 Contractor/collaboration partner server (related service provider server)
600, 600A Provision user information confirmation screen
800 Network
810 Distributed ledger
850 User information issuing institution server

The invention claimed is:

1. A user information management system comprising:
a user terminal used by a user;
a user agent; and
a service provider server, wherein:
the user agent includes:
a storage configured to store:
a registered user database in which user identification information of the user and user information of the user are stored in association with each other; and
a provided user information database in which the service provider server and provided user information that was provided to the service provider server are stored in association with each other;
a user information providing destination search unit, implemented using one or more computing devices, configured to:
receive a request from the user terminal with a service provider service document including identification information of the service provider server and a user information type requested by the service provider server; and transmit (i) a first set of user information of the user of the user terminal already provided to the service provider server and (ii) a second set of user information of the user corresponding to the user information type to the user terminal; and a user information access right approval unit, implemented using one or more computing devices, configured to:
receive service provider server permission indicating a portion of the user information to be provided to the service provider server from the user terminal;
generate (i) pseudo user identification information that identifies the user in the service provider server and (ii) a pair of a private key and a public key associated with the pseudo user identification information;
generate a signed service provider service document obtained by adding a signature to the service provider service document using the private key; and
transmit the pseudo user identification information and the signed service provider service document to the user terminal;

the user terminal includes:
a user information provision request unit, implemented using one or more computing devices, configured to transmit the service provider server permission to the user agent; and
a service document transfer unit, implemented using one or more computing devices, configured to transmit the pseudo user identification information and the signed service provider service document to the service provider server;

the service provider server includes:
a user information request unit, implemented using one or more computing devices, configured to transmit the pseudo user identification information and the signed service provider service document to the user agent; and the user agent further includes:
a providing unit, implemented using one or more computing devices, configured to verify the signature of the signed service provider service document using the public key associated with the pseudo user identification information, and return the service provider server permission to the service provider server in a case where the verification is successful.

2. The user information management system according to claim 1, further comprising:
a related service provider server configured to provide a service in cooperation with the service provider server, in which the related service provider server includes a related user information request unit, wherein:
the service provider server further includes a related service document transfer unit;
in the service provider service document, the identification information of the related service provider server is further included;
in the provided user information database, the related service provider server and the user information provided to the related service provider server are stored in association with each other;
the user information providing destination search unit of the user agent is configured to receive a request from the user terminal with a related service provider service document including related identification information of the related service provider server and a type of information requested by the related service provider server and transmits a third set of user information of the user of the user terminal already provided to the related service provider server to the user terminal;
the user information provision request unit of the user terminal is configured to transmit related service provider server permission indicating additional user information to be provided to the related service provider server to the user agent;
the user information access right approval unit of the user agent is configured to generate a signed related service provider service document obtained by adding a corresponding signature to the related service provider service document using the private key, and transmit the pseudo user identification information and the signed service provider service document to the user terminal;
the service document transfer unit included in the user terminal is configured to transmit the signed related service provider service document to the service provider server;
the related service document transfer unit of the service provider server is configured to transmit the pseudo user identification information, the signed service provider service document, and the signed related service provider service document to the related service provider server;
the related user information request unit of the related service provider server is configured to transmit the pseudo user identification information, the signed service provider service document, and the signed related service provider service document to the user agent; and
the providing unit of the user agent is configured to:
verify the signature of the signed service provider service document using the public key associated with the pseudo user identification information;
in a case where the verification is successful, verify that identification information of the related service provider server is included in the signed service provider service document;
in a case where the verification is successful, verify the signature of the signed related service provider service document using the public key associated with the pseudo user identification information; and
in a case where the verification is successful, return the related service provider server permission to the related service provider server.

3. The user information management system according to claim 1, wherein the providing unit of the user agent is configured to acquire the service provider server permission from the registered user database, extract the service provider server permission into extracted user information corresponding to a user information type included in the signed service provider service document, and return the extracted user information to the service provider server.

4. The user information management system according to claim 1, wherein the user information provision request unit of the user terminal is configured to display a provision user information confirmation screen including at least one of previously provided user information already provided to the service provider server, new user information to be provided to the service provider server, related user information already provided to the related service provider server, and related user information to be provided to the related service provider server, and acquire the service provider server permission.

5. A user agent of an information management system including a user terminal used by a user, the user agent, and a service provider server, the user agent comprising:
- a storage configured to store a registered user database in which user identification information of the user and user information of the user are stored in association with each other, and a provided user information database in which the service provider server and provided user information that was provided to the service provider server are stored in association with each other;
- a user information providing destination search unit, implemented using one or more computing devices, configured to:
  - receive a request from the user terminal with a service provider service document including identification information of the service provider server and a user information type requested by the service provider server; and
  - transmit a first set of user information of the user of the user terminal already provided to the service provider server and a second set of user information of the user corresponding to the user information type to the user terminal;
- a user information access right approval unit, implemented using one or more computing devices, configured to:
  - receive service provider server permission indicating a portion of the user information to be provided to the service provider server;
  - generate pseudo user identification information that identifies the user in the service provider server and a pair of a private key and a public key associated with the pseudo user identification information;
  - generate a signed service provider service document obtained by adding a signature to the service provider service document using the private key; and
  - transmit the pseudo user identification information and the signed service provider service document to the user terminal; and
- a user information providing unit, implemented using one or more computing devices, configured to:
  - verify a signature of the signed service provider service document obtained from the user terminal and transmitted by the service provider server using a public key associated with the pseudo user identification information; and
  - return the service provider server provision permission user information to the service provider server in a case where the verification is successful.

6. A non-transitory computer recording medium storing a program, wherein execution of the program causes one or more computers to perform operations comprising:
- storing, in a storage, a registered user database in which user identification information of a user and user information of the user are stored in association with each other, and a provided user information database in which a service provider server and provided user information that was provided to the service provider server are stored in association with each other, and
- receiving a request from a user terminal with a service provider service document including identification information of the service provider server and a user information type requested by the service provider server;
- transmitting a first set of user information of the user of the user terminal already provided to the service provider server and a second set of user information of the user corresponding to the user information type to the user terminal;
- receiving service provider server permission indicating a portion of the user information to be provided to the service provider server;
- generating pseudo user identification information that identifies the user in the service provider server and a pair of a private key and a public key associated with the pseudo user identification information;
- generating a signed service provider service document obtained by adding a signature to the service provider service document using the private key;
- transmitting the pseudo user identification information and the signed service provider service document to the user terminal;
- verifying the signature of the signed service provider service document obtained from the user terminal and transmitted by the service provider server using the public key associated with the pseudo user identification information; and
- returning the service provider server permission to the service provider server in a case where the verification is successful.

\* \* \* \* \*